(12) United States Patent
Picard et al.

(10) Patent No.: US 10,973,093 B2
(45) Date of Patent: Apr. 6, 2021

(54) CONTROL MODULE FOR A DRIVER FOR AN ELECTRICAL LOAD

(71) Applicant: Lutron Technology Company LLC, Coopersburg, PA (US)

(72) Inventors: Jonathan Picard, Bethlehem, PA (US); Johnathan Paul Ross, Bethlehem, PA (US); Robert D. Stevens, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 23 days.

(21) Appl. No.: 15/832,286

(22) Filed: Dec. 5, 2017

(65) Prior Publication Data

US 2018/0160493 A1    Jun. 7, 2018

Related U.S. Application Data

(60) Provisional application No. 62/430,141, filed on Dec. 5, 2016.

(51) Int. Cl.
| | | |
|---|---|---|
| *H05B 45/00* | (2020.01) | |
| *G03B 7/097* | (2006.01) | |
| *H05B 45/46* | (2020.01) | |
| *H05B 47/19* | (2020.01) | |
| *H05B 47/105* | (2020.01) | |
| *H05B 47/155* | (2020.01) | |
| *H05B 45/20* | (2020.01) | |

(52) U.S. Cl.
CPC ............ *H05B 45/00* (2020.01); *G03B 7/097* (2013.01); *H05B 45/46* (2020.01); *H05B 47/105* (2020.01); *H05B 47/155* (2020.01); *H05B 47/19* (2020.01); *H05B 45/20* (2020.01)

(58) Field of Classification Search
None
See application file for complete search history.

(56) References Cited

U.S. PATENT DOCUMENTS 8,339,064 B2    12/2012   Ku et al.
8,456,109 B1    6/2013    Wray
(Continued)

FOREIGN PATENT DOCUMENTS

JP    2008146949 A    6/2008

*Primary Examiner* — Lynda Jasmin
*Assistant Examiner* — Laura Yesildag
(74) *Attorney, Agent, or Firm* — Condo Roccia Koptiw LLP

(57) ABSTRACT

A lighting control system for controlling a cumulative light emitted by a lighting fixture may comprise a light-emitting diode (LED) driver comprising an output for conducting an output current, and a control module electrically coupled to the output of the LED driver for receiving the output current. The LED driver may regulate the magnitude of the output current towards a target current, and may be characterized by a low-end intensity. The control module may be coupled to a first LED light source of the LED light sources. The control module may receive a command including a requested intensity and control the magnitude of a first LED current through the first LED light source. The control module may control the cumulative light output of the lighting fixture below the low-end intensity of the LED driver by diverting a portion of the output current away from the first LED light source.

16 Claims, 11 Drawing Sheets

(56) References Cited

U.S. PATENT DOCUMENTS

| | | | |
|---|---|---|---|
| 8,742,695 B2 | 6/2014 | Wray | |
| 8,760,074 B2 | 6/2014 | Raj et al. | |
| 8,803,432 B2 | 8/2014 | Hausman, Jr. | |
| 9,113,521 B2 | 8/2015 | Gredler et al. | |
| 9,131,581 B1 | 9/2015 | Hsia et al. | |
| 9,144,131 B2 | 9/2015 | Wray | |
| 9,220,133 B2 | 12/2015 | Salvestrini | |
| 9,253,849 B2 | 2/2016 | Ter Weeme et al. | |
| 9,295,126 B2 | 3/2016 | Harbers | |
| 9,301,359 B2 | 3/2016 | Wray | |
| 9,392,675 B2 | 7/2016 | Taipale et al. | |
| 9,538,600 B2 | 1/2017 | Chitta et al. | |
| 9,565,731 B2 | 2/2017 | DeJonge | |
| 9,595,880 B2 | 3/2017 | Knode et al. | |
| 9,736,911 B2 | 8/2017 | Taipale et al. | |
| 9,756,696 B1 * | 9/2017 | Bradford | H05B 33/0866 |
| 9,888,543 B2 | 2/2018 | Chitta et al. | |
| 2014/0103827 A1 * | 4/2014 | Newman, Jr. | H05B 33/0815 |
| | | | 315/200 R |
| 2014/0184076 A1 | 7/2014 | Murphy | |
| 2016/0157318 A1 | 6/2016 | Yadav et al. | |
| 2017/0208660 A1 * | 7/2017 | Hilgers | H05B 45/50 |

\* cited by examiner

CONTROL MODULE FOR A DRIVER FOR AN ELECTRICAL LOAD

CROSS-REFERENCE TO RELATED APPLICATIONS

This application claims the benefit of Provisional U.S. Patent Application No. 62/430,141, filed Dec. 5, 2016, the disclosure of which is incorporated herein by reference in its entirety.

BACKGROUND

Traditional sources of light such as the sun (and later incandescent lights) may exhibit the characteristics of a black body radiator. Such light sources typically emit a relatively continuous-spectrum of light, and the continuous emissions range the entire bandwidth of the visible light spectrum (e.g., light with wavelengths between approximately 390 nm and 700 nm). The human eye has grown accustomed to operating in the presence of black body radiators and has evolved to be able to distinguish a large variety of colors when emissions from a black body radiator are reflected off an object of interest.

Further, the frequency or wavelength of the continuous light spectrum emitted by a black body radiator may be dependent on the temperature of the black body radiator. Plank's law states that a black body radiator in thermal equilibrium will emit a continuous-spectrum of light that is dependent on the equilibrium temperature of the black body. As the temperature of the black body radiator increases, the frequency of the peak of the emitted spectrum shifts to higher frequencies. At room temperature (e.g., roughly 300 Kelvin (K)), the frequency peak is typically within the infrared portion of the spectrum and thus is imperceptible to the human eye. However, when the temperature is increased to approximately 700-750 K, the blackbody radiator will begin to emit light in the visible range of the electromagnetic spectrum.

Typically, as the temperature of the black body radiator decreases, the wavelength of the emitted light increases and the frequency decreases, such that the emitted light appears "redder". As the temperature increases, the peak of the emitted spectrum become "bluer" or decreases in wavelength (e.g., increases in frequency). For black body radiators, this relationship between temperature and wavelength/frequency of the emitted light is inseparable—higher temperature radiators appear bluer and lower temperature radiators appear redder.

Thus, various wavelengths/frequencies of the visible light spectrum may be associated with a given "color temperature" of a black body radiator. The color temperature of a light source may refer to the temperature of an ideal black body radiator that radiates light of comparable hue to that of the light source. For example, candlelight, tungsten light (e.g., from an incandescent bulb), early sunrise, and/or household light bulbs may appear to have relatively low color temperatures, for example on the range of 1,000-3,000 K. Noon daylight, direct sun (e.g., sunlight above the atmosphere), and/or electronic flash bulbs may appear to have color temperature values on the order of 4,000-5,000 K and may have a greenish blue hue. An overcast day may appear to have a color temperature of approximately 7,000 K and may be even bluer than noon daylight. North light may be bluer still, appearing to have a color temperature on the range of 10,000 K. Color temperatures over 5,000 K are often referred to as cool colors (e.g., bluish white to deep blue), while lower color temperatures (e.g., 2,700-3,000 K) are often referred to as warm colors (e.g., red through yellowish white).

Incandescent and halogen lamps typically act as black body radiators. For example, a current is passed through a wire (e.g., a filament), causing the wire to increase in temperature. When the wire reaches a critical temperature, it begins to radiate light in the visible spectrum. The color temperature of the radiated light is dictated by Plank's law. When an incandescent or halogen light is dimmed, the temperature (and color temperature) is decreased, meaning that the emitter light becomes redder (e.g., higher wavelength, lower frequency). Thus, humans are accustomed to dimmed lights having a redder hue.

Recently, non-incandescent light sources such as fluorescent lights (e.g., compact fluorescent lights or CFLs) and light emitting diodes (LEDs) have become more widely available due to their increased efficiency as compared to traditional incandescent lamps. Typically light from CFLs or LEDs does not exhibit the properties of a black body radiator. Instead, the emitted light is often more discrete in nature due to the differing mechanisms by which CFLs and/or LEDs generate light as compared to an incandescent or Halogen light bulbs. Since fluorescents and LEDs do not emit relatively constant amounts of light across the visible light spectrum (e.g., instead having peaked intensities at one or more discrete points within the visible spectrum), fluorescents and LEDs are often referred to as discrete-spectrum light sources.

The wavelength/frequency profile of a light source may be dependent on the device or technique used to generate the light. For example, light from fluorescent lamps is produced by electrically exciting mercury within a glass tube. The applied voltage causes the mercury to become a plasma that emits light in the ultraviolet (UV) frequency range. Typically, the glass tube is coated with a phosphorus-based material that absorbs the radiated UV light and then emits light in the visible frequency range. The wavelength shift from UV to the visible range is referred to as Stokes shift. Depending on the properties of the phosphorus-based material, the wavelength/frequency of the light emitted may be at different points within the visible spectrum. A CFL lamp may emit a discrete spectrum of light, which may be characterized by one or more "bursts" of emissions at discrete frequencies/wavelengths.

Light from LEDs is produced due to the physical properties of a semiconducting material. For example, when a voltage is applied across a semiconductor junction that has different energy levels across the boundary due to doping, an electric current is induced. When an electron from one side of the device recombines with an electron hole on the other, a photon is emitted. Depending on the semiconductor design, the photons may be emitted at various wavelengths/frequencies. Like fluorescents, Stokes shift may cause the frequency of the emitted photons to be lowered to achieve a desired light frequency output. Like the emissions from the fluorescent lamp, the LED light may also be relatively discrete in nature (e.g., a discrete spectrum).

When discrete-spectrum light sources are dimmed, their color temperature may not change in the same manner as black body radiators. For example, when incandescent lamps and halogen lamps are dimmed, their temperature is decreased and the emitted light transitions to a lower color temperature value (e.g., becomes redder) according to Plank's law. However, since discrete-spectrum light sources are not black body radiators, Plank's law may not apply. For example, both fluorescent lamps and LEDs may maintain a relatively constant color temperature even in the presence of dimming (e.g., and may actually become slightly bluer or higher frequency as they are dimmed). Such an effect may be unnatural to the human eye, which may expect the color temperature to shift to a redder temperature as the light dims. Moreover, when discrete-spectrum light sources are placed in the vicinity of other light sources, for example sources of light whose color temperature may change over time, the discrete-spectrum light sources can appear unnatural or distracting.

Further, certain load regulation devices (e.g., LED drivers) may not be equipped with the capability to control a current conducted through an electrical load (e.g., an LED light source) to a desired magnitude (e.g., a low-end magnitude). Testing equipment (e.g., testing loads) for load regulation devices may also be lacking.

SUMMARY

As described herein, a lighting control system for controlling a cumulative light emitted by a lighting fixture may comprise an LED driver adapted to receive power from a power source and including an output for conducting an output current, and a control module electrically coupled to the output of the LED driver for receiving the output current. The LED driver may be configured to regulate the magnitude of the output current towards a target current, and may be characterized by a low-end intensity. The control module may be adapted to be coupled to a first LED light source of the LED light sources. The control module may be configured to receive a command including a requested intensity and control the magnitude of a first LED current through the first LED light source. The control module may be configured to control the cumulative light output of the lighting fixture below the low-end intensity of the LED driver by diverting a portion of the output current away from the first LED light source.

The control module may comprise input terminals adapted to be coupled to the output of the LED driver for receiving the output current, and output terminals adapted to be coupled to the first LED light source of the LED light sources. In addition, the control module may comprise a controllably conductive device configured to be electrically coupled in series with the first LED light source and a control circuit configured to control the controllably conductive device to control the magnitude of the first LED current through the first LED light source. The control module may be coupled to the LED driver via a communication link (e.g., an analog control link) for adjusting the magnitude of the output current of the LED driver. Further, the control module may be configured to modulate the first LED current to cause the first LED light source to transmit visible light communication signals.

The control module may further comprise an artificial load circuit electrically coupled to divert a portion of the output current of the LED driver away from the first LED light source. The control circuit may be configured to control the cumulative light output of the lighting fixture below the low-end intensity of the LED driver by causing the artificial load circuit to conduct the portion of the output current of the LED driver (e.g., to divert current away from the first LED light source).

DETAILED DESCRIPTION

Figure 1:
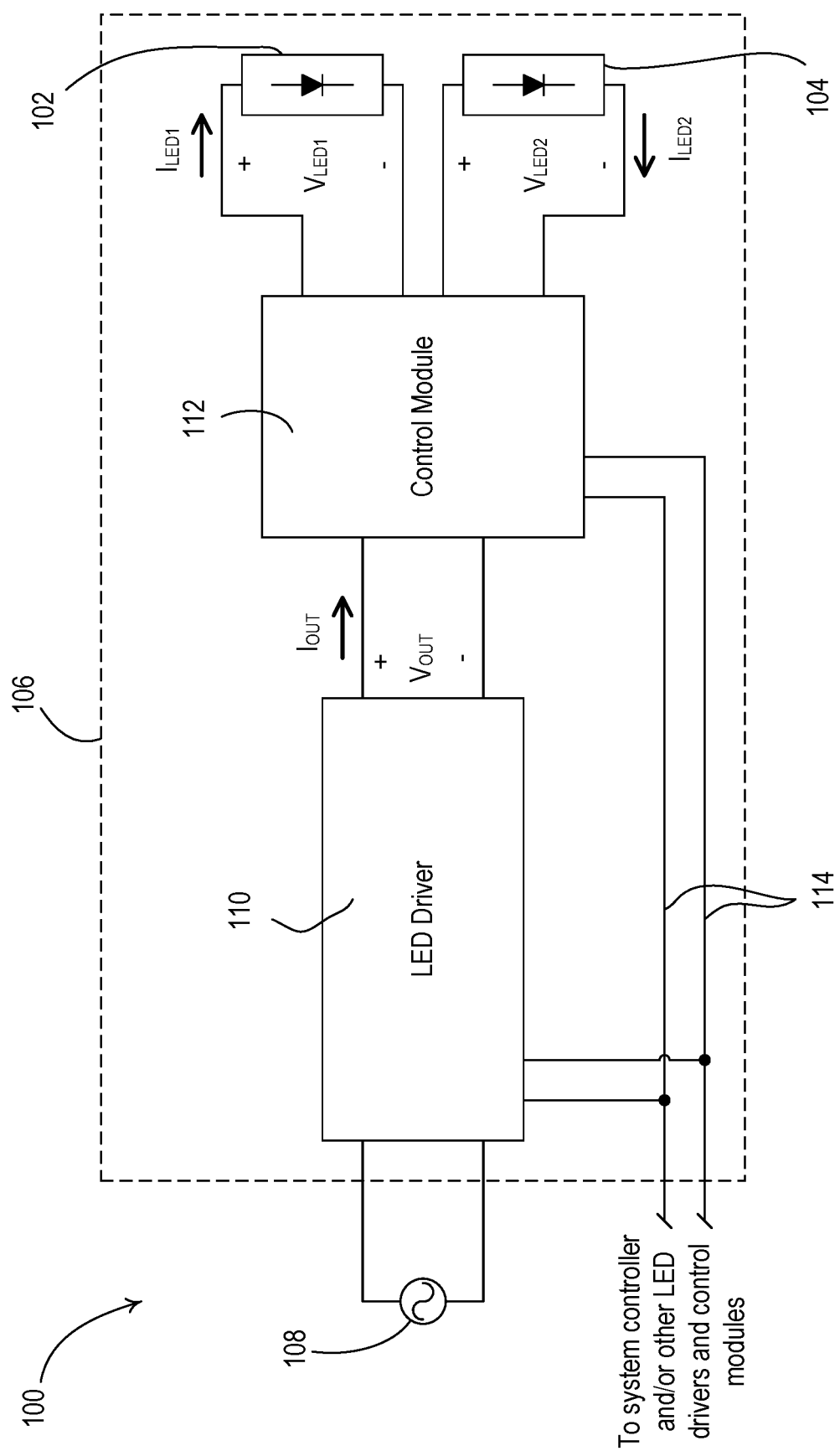
FIGS. 1 and 2 are simple diagrams of example load control systems for controlling one or more electrical loads, such as light-emitting diode (LED) light sources, installed in a lighting fixture.

FIG. 1 is a simple diagram of an example load control system 100 for controlling one or more electrical loads. For example, the load control system 100 may provide for control of two lighting loads, such as first and second light-emitting diode (LED) light sources 102, 104 (e.g., LED light engines), installed in a lighting fixture 106. The LED light sources 102, 104 may have different operating characteristics (e.g., color temperature, power rating, etc.) as will be described in greater detail below.

The load control system 100 may comprise a load regulation device, such as an LED driver 110, and a control module 112, which may both be installed in the lighting fixture 106. The LED driver 110 may be coupled to a power source, such as an alternating-current (AC) power source 108, and may be configured to generate an output voltage $V_{OUT}$ at an output. The control module 112 may be coupled to the output of the LED driver 110 to receive the output voltage $V_{OUT}$. The LED driver 110 may be configured to control the amount of power delivered to the control module 112 by regulating a magnitude of an output current $I_{OUT}$ (e.g., controlling the magnitude of the output current $I_{OUT}$ towards a target current $I_{TRGT}$).

The control module 112 may be configured to control (e.g., individually control) the amount of power delivered to the first and second LED light sources 102, 104 to thus control the intensities of the LED light sources. The control module 112 may be configured to conduct a first LED current $I_{LED1}$ through the first LED light source 102, such that a first LED voltage $V_{LED1}$ is generated across the first LED light source. The control module 112 may be configured to conduct a second LED current $I_{LED2}$ through the second LED light source 104, such that a second LED voltage $V_{LED2}$ is generated across the second LED light source. For example, the LED light sources 102, 104 may be different color LED light sources and the light emitted by the LED light sources may be mixed together to adjust the color temperature of the cumulative light emitted by the lighting fixture 106. For example, the first LED light source 102 may be a cool-white LED light source and the second LED light source 104 may be a warm-white LED light source. The control module 112 may be configured to adjust the intensities of the cool-white light emitted by the first LED light source 102 and the warm-white light emitted by the second LED light source 104 to control the color temperature of the cumulative light emitted by the lighting fixture 106.

The LED driver 110 and the control module 112 may be coupled to a communication link 114 (e.g., a digital communication link), such that the LED driver 110 and the control module 112 may be able to transmit and/or receive messages (e.g., digital messages) via the communication link. The LED driver 110 and the control module 112 may be configured to communicate on the communication link 114 using the same communication protocol. The LED driver 110 and the control module 112 may each be assigned a unique identifier (e.g., a link address) for communication on the communication link 114. The LED driver 110 and the control module 112 may be configured to communicate with a system controller (not shown), as well as other LED drivers and control modules, via the communication link 114. For example, the communication link 114 may comprise a wired communication link, for example, a digital communication link operating in accordance with one or more predefined communication protocols (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, or a LUTRON ECOSYSTEM communication link. Additionally or alternatively, the digital communication link 114 may comprise a wireless communication link, for example, a radio-frequency (RF), infrared (IR), or optical communication link. Digital messages may be transmitted on an RF communication link using, for example, one or more of a plurality protocols, such as the LUTRON CLEARCONNECT, WIFI, ZIGBEE, Z-WAVE, THREAD, KNX-RF, and ENOCEAN RADIO protocols.

The LED driver 110 and the control module 112 may be responsive to messages (e.g., digital messages that include the respective link address of the LED driver and/or control module) transmitted by the system controller to the LED driver and the control module via the communication link 114. The LED driver 110 and the control module 112 may be configured to control the LED light sources 102, 104 in response to the messages received via the digital communication link 114. The system controller may be configured to transmit messages to the LED driver 110 and the control module 112 for turning both LED light sources 102, 104 on and off (e.g., to turn the lighting fixture 106 on and off). The system controller may also be configured to transmit messages to the LED driver 110 and the control module 112 for adjusting at least one of an intensity and a color temperature of the cumulative light emitted by the lighting fixture 106. The LED driver 110 and the control module 112 may be configured to transmit messages including feedback information via the digital communication link 114.

The system controller may be configured to transmit a command (e.g., control instruction) to the LED driver 110 and/or the control module 112 for adjusting the intensity and/or the color temperature of the cumulative light emitted by the lighting fixture 106 (e.g., the light emitted by the first and second LED light sources 102, 104). For example, the command may include a requested intensity (e.g., a desired intensity or target intensity) and/or a requested color temperature (e.g., a desired color temperature or target color temperature) for the cumulative light emitted by the lighting fixture 106. The control module 112 may adjust the magnitudes of the LED currents $I_{LED1}$, $I_{LED2}$ to control the cumulative light emitted by the lighting fixture 106 to the requested color temperature of the command.

The command may include only an intensity (e.g., and not a color temperature), and the control module 112 may adjust the magnitudes of the LED currents $I_{LED1}$, $I_{LED2}$ to control the cumulative light emitted by the lighting fixture 106 in response to the intensity of the command, for example, to cause the cumulative light emitted by the lighting fixture 106 to become redder as the intensity is decreased (e.g., dimmed). For example, the control module 112 may receive an intensity command and, in response to the intensity command, control the magnitude of the LED currents $I_{LED1}$, $I_{LED2}$ to not only achieve the requested intensity, but also to approximate the associated color temperature of a black body radiator illuminated at the requested intensity (e.g., according to Plank's law). The intensity of the cumulative light emitted by the lighting fixture 106 may range between a high-end intensity $L_{HE}$ (e.g., a maximum intensity, such as 100%) and a low-end intensity $L_{LE}$ (e.g., a minimum intensity, such as 0.1-10%).

The color temperature of the cumulative light emitted by the lighting fixture 106 may range between a cool-white color temperature $T_{CW}$ when only the first LED light source is on to the warm-white color temperature $T_{WW}$ when only the second LED light source is on. The control module 112 may be configured to adjust the color temperature between the cool-white color temperature $T_{CW}$ and the warm-white color temperature $T_{WW}$ by turning both LED light sources on. The control module 112 may control the magnitudes of the LED currents $I_{LED1}$, $I_{LED2}$ to mix the cool-white light emitted by the first LED light source 102 and the warm-white light emitted by the second LED light source 104, respectively, to control the color temperature of the cumulative light emitted by the lighting fixture 106 to the requested color temperature.

The LED driver 110 may adjust the intensity of the cumulative light emitted by the lighting fixture 106 by controlling the magnitude of the output current $I_{OUT}$ of the LED driver 110. The LED driver 110 may be configured to adjust the magnitude of the output current $I_{OUT}$ between a maximum current $I_{MAX}$ (e.g., at a high-end intensity $L_{HE\text{-}DRIVER}$) and a minimum current $I_{MIN}$ (e.g., at a low-end intensity $L_{LE\text{-}DRIVER}$). The control module 112 may split the output current $I_{OUT}$ generated by the LED driver 110 between the first and second LED light sources 102, 104 to achieve the requested color temperature of the cumulative light emitted by the lighting fixture 106. In this example, the sums of the magnitudes of the first and second LED currents $I_{LED1}$, $I_{LED2}$ may be approximately equal to the magnitude of the output current $I_{OUT}$.

The system controller may be configured to transmit a command including the requested intensity and the requested color temperature to both of the LED driver 110 and the control module 112. The LED driver 110 may be configured to determine the target current $I_{TRGT}$ to which to regulate the magnitude of the output current $I_{OUT}$ in response to the requested intensity of the command and the control module 112 may adjust the magnitudes of the first and second LED currents $I_{LED1}$, $I_{LED2}$ in response to the requested color temperature of the command. In addition, the system controller may be configured to transmit a first command including the requested intensity to the LED driver 110 and a second command including the requested color temperature to the control module 112. In this example, the low-end intensity $L_{LE}$ of the cumulative light emitted by the lighting fixture 106 may be equal to the low-end intensity $L_{LE-DRIVER}$ of the LED driver 110.

The control module 112 may be configured to control the intensity of the cumulative light emitted by the lighting fixture 106 below the low-end intensity $L_{LE-DRIVER}$ of the LED driver 110. For example, the low-end intensity $L_{LE}$ of the lighting fixture 106 may be less than the low-end intensity $L_{LE-DRIVER}$ of the LED driver 110. The control module 112 may be configured to divert at least a portion of the output current $I_{OUT}$ of the LED driver 110 away from both of the LED light sources 102, 104 (e.g., as will be described in greater detail below). The control module 112 may split the remaining current of the output current $I_{OUT}$ between the first and second LED light sources 102, 104 to achieve the requested color temperature of the cumulative light emitted by the lighting fixture 106. In this example, the sum of the magnitudes of the diverted current and the first and second LED currents $I_{LED1}$, $I_{LED2}$ may be approximately equal to the magnitude of the output current $I_{OUT}$. The system controller may be configured to transmit a command including the requested intensity and the requested color temperature to both of the LED driver 110 and the control module 112. In addition, the system controller may be configured to transmit a first command including the requested intensity to the LED driver 110 and a second command including both the intensity and the requested color temperature to the control module 112.

The control module 112 may be configured to fade the intensity of the cumulative light emitted by the lighting fixture 106 (e.g., gradually adjust the intensity over a period of time). For example, when fading the lighting fixture 106 on (e.g., to provide a "soft-on" feature), the control module 112 may be configured to gradually increase the intensity of the cumulative light emitted by the lighting fixture from a starting intensity (e.g., which may be less than the low-end intensity $L_{LE}$ of the lighting fixture 106) to the requested intensity over a turn-on period. In addition, when fading the lighting fixture 106 off (e.g., to provide a "fade-to-black" feature), the control module 112 may be configured to gradually decrease the intensity of the cumulative light emitted by the lighting fixture from the present intensity to an ending intensity (e.g., which may be less than the low-end intensity $L_{LE}$ of the lighting fixture 106) over a turn-off period. When fading the intensity of the lighting fixture 106, the control module 112 may be configured to control the intensity of the lighting fixture 106 below the low-end of the lighting fixture by diverting at least a portion of the output current $I_{OUT}$ of the LED driver 110 away from both of the LED light sources 102, 104 (e.g., as described above).

The control module 112 may be configured to modulate one or both of the first and second LED currents $I_{LED1}$, $I_{LED2}$ to cause the respective LED light sources 102, 104 to emit optical communication signals, e.g., visible light communication (VLC) signals. For example, the control module 112 may be configured to cause one or both of the LED light sources 102, 104 to transmit the VLC signals to a mobile device (e.g., a smart phone, a tablet, etc.) during commissioning of the load control system 100. In addition, the control module 112 may be configured to cause one or both of the LED light sources 102, 104 to transmit beacons via the VLC signals, e.g., for use in a real time location system (RTLS), and/or to transmit network data via the VLC signals, e.g., from a Li-Fi network.

Figure 2:
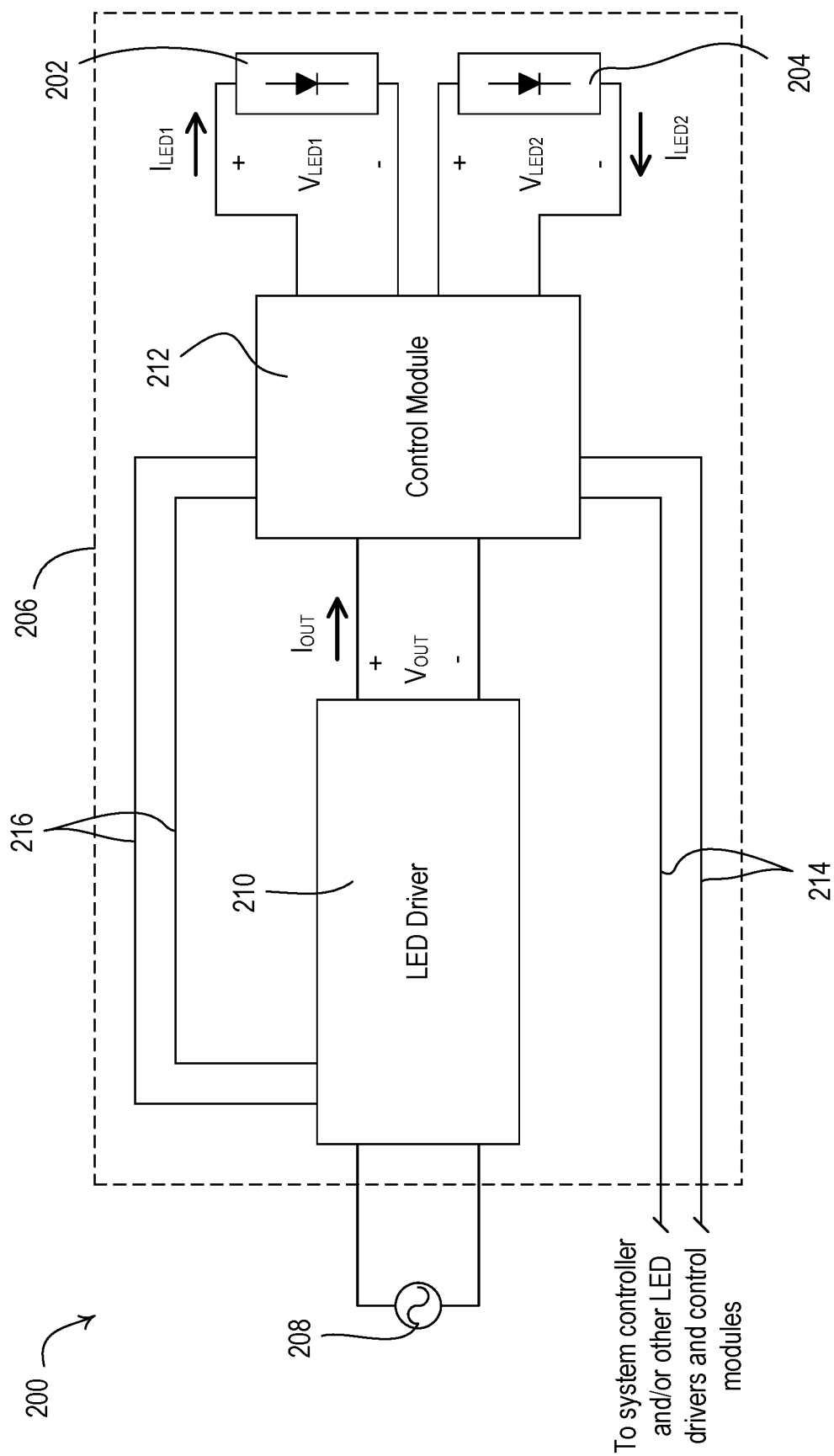

FIG. 2 is a simple diagram of another example load control system 200 for controlling one or more electrical loads, for example, two lighting loads, such as first and second LED light sources 202, 204, installed in a lighting fixture 206. The load control system 200 may comprise a load regulation device, such as an LED driver 210, and a control module 212. In the load control system 200 of FIG. 2, both of the LED driver 210 and the control module 212 may not be configured to communicate on a digital communication link using the same communication protocol (e.g., as will be described in greater detail below). The LED driver 210 may be coupled to a power source, such as an alternating-current (AC) power source 208, and may be configured to generate an output voltage $V_{OUT}$ at an output. The LED driver 210 may be configured to control the amount of power delivered to the control module 212 by regulating a magnitude of an output current $I_{OUT}$ (e.g., controlling the magnitude of the output current $I_{OUT}$ towards a target current $I_{TRGT}$).

As in the load control system 100 of FIG. 1, the LED light sources 202, 204 of FIG. 2 may have different operating characteristics (e.g., color temperature, power rating, etc.) as will be described in greater detail below. The control module 212 may be configured to control (e.g., individually control) the amount of power delivered to the first and second LED light sources 202, 204 to thus control the intensities of the LED light sources. The control module 212 may be configured to conduct a first LED current $I_{LED1}$ through the first LED light source 202, such that a first LED voltage $V_{LED1}$ is generated across the first LED light source. The control module 212 may be configured to conduct a second LED current $I_{LED2}$ through the second LED light source 204, such that a second LED voltage $V_{LED2}$ is generated across the second LED light source. For example, the LED light sources 202, 204 may be different color LED light sources (e.g., a cool-white LED light source and a warm-white LED light source, respectively). The control module 212 may be configured to adjust the intensities of the cool-white light emitted by the first LED light source 202 and the warm-white light emitted by the second LED light source 204 to control the color temperature of the cumulative light emitted by the lighting fixture 206.

The load control system 200 may comprise a communication link 214 (e.g., a digital communication link) to allow for communication of messages (e.g., digital messages) between the control devices of the load control system. The communication link 214 may be wired or wireless. For example, the communication link 214 may be similar to the communication link 114 of the load control system 100 of FIG. 1. For example, the control module 212 may be coupled to the communication link 214 to allow the control module 212 to communicate with other control devices, such as a system controller (not shown) and other control modules, using a wired or wireless protocol. The control module 212 may be assigned a unique identifier (e.g., a link address) for communication on the communication link 214.

As shown in FIG. 2, the LED driver 210 may not be coupled to the communication link 214. The LED driver 210 may be coupled to the control module 212 via an analog control link 216 (e.g., a 0-10V control link) for control of the output current $I_{OUT}$ of the LED driver 210. The control module 212 may be configured to generate an analog control signal (e.g., a 0-10V control signal) on the analog control link 216 for controlling the magnitude of the output current $I_{OUT}$ of the LED driver 210. Alternatively or additionally, the control module 212 may be coupled to the LED driver 210 via a digital communication link, e.g., a digital communication link that allows for communication using a digital communication protocol (e.g., a protocol different than that used on the communication link 214).

The LED driver 204 may be configured to adjust the magnitude of the output current $I_{OUT}$ to a minimum current $I_{MIN}$ (e.g., at a low-end intensity $L_{LE\text{-}DRIVER}$) when a 0-10V control signal is received that has a magnitude of approximately zero volts, and to a maximum current $I_{MAX}$ (e.g., at a high-end intensity $L_{HE\text{-}DRIVER}$) when a 0-10V control signal is received that has a magnitude of approximately ten volts. The LED driver 204 may be configured to adjust the magnitude of the output current $I_{OUT}$ to a magnitude that is scaled (e.g., linearly scaled) between the minimum current $I_{MIN}$ and the maximum current $I_{MAX}$ when a 0-10V control signal is received that has a magnitude between zero and ten volts.

The control module 212 may be responsive to messages (e.g., digital messages that include the link address of the control module) transmitted by the system controller to the control module via the communication link 214. The control module 212 may be configured to control the LED light sources 202, 204 in response to the messages received via the digital communication link 214. The system controller may be configured to transmit messages to the control module 212 for turning both LED light sources 202, 204 on and off (e.g., to turn the lighting fixture 206 on and off). The system controller may also be configured to transmit messages to the control module 212 for adjusting at least one of the intensity or the color temperature of the cumulative light emitted by the lighting fixture 206. The control module 212 may be configured to transmit messages including feedback information via the digital communication link 214.

The system controller may be configured to transmit a command to the control module 212 for adjusting the intensity and/or the color temperature of the cumulative light emitted by the lighting fixture 206 (e.g., the light emitted by the first and second LED light sources 202, 204). For example, the command may include a requested intensity and/or a requested color temperature for the cumulative light emitted by the lighting fixture 206. The control module 212 may adjust the magnitudes of the LED currents $I_{LED1}$, $I_{LED2}$ to control the cumulative light emitted by the lighting fixture 206 to the requested color temperature of the command.

The command transmitted by the system controller may include only an intensity (e.g., and not color temperature), and the control module 212 may adjust the magnitudes of the LED currents $I_{LED1}$, $ILED_2$ to control the cumulative light emitted by the lighting fixture 206 in response to the intensity of the command, for example, to cause the cumulative light emitted by the lighting fixture 206 to become redder as the intensity is decreased (e.g., dimmed). For example, the control module 212 may receive an intensity command and, in response to the intensity command, control the magnitude of the LED currents $I_{LED1}$, $I_{LED2}$ to not only achieve the requested intensity, but also to approximate the associated color temperature of a black body radiator illuminated at the requested intensity (e.g., according to Plank's law). The intensity of the cumulative light emitted by the lighting fixture 206 may range between a high-end intensity $L_{HE}$ (e.g., a maximum intensity, such as 100%) and a low-end intensity $L_{LE}$ (e.g., a minimum intensity, such as 0.1-10%).

The color temperature of the cumulative light emitted by the lighting fixture 206 may range between the cool-white light of the first LED light source 202 (when only the first LED light source is on) to the warm-white light of the second LED light source 204 (when only the second LED light source is on). The control module 212 may be configured to adjust the color temperature between the cool-white light of the first LED light source 202 and the warm-white light of the second LED light source 204 by turning both LED light sources on. The control module 212 may control the magnitudes of the LED currents $I_{LED1}$, $I_{LED2}$ to mix the cool-white light emitted by the first LED light source 202 and the warm-white light emitted by the second LED light source 204, respectively, to control the color temperature of the cumulative light emitted by the lighting fixture 206 to the requested color temperature.

The control module 212 may control the LED driver 210 to adjust the intensity of the cumulative light emitted by the lighting fixture 106 by generating the analog control signal on the analog control link 216 to control the magnitude of the output current $I_{OUT}$ of the LED driver 210. The control module 212 may split the output current $I_{OUT}$ generated by the LED driver 210 between the first and second LED light sources 202, 204 to achieve the requested color temperature of the cumulative light emitted by the lighting fixture 206. In this example, the sum of the magnitudes of the first and second LED currents $I_{LED1}$, $I_{LED2}$ may be approximately equal to the magnitude of the output current $I_{OUT}$. The system controller may be configured to transmit a command including the requested intensity and the requested color temperature to the control module 212. The control module 212 may control the LED driver 210 via the analog control signal to adjust the magnitude of the output current $I_{OUT}$ in response to the requested intensity of the command and may adjust the magnitudes of the first and second LED currents $I_{LED1}$, $I_{LED2}$ in response to the requested color temperature of the command. The LED driver 210 may be configured to determine the target current $I_{TRGT}$ to which to regulate the magnitude of the output current $I_{OUT}$ in response to the analog control signal. In this example, the low-end intensity $L_{LE}$ of the cumulative light emitted by the lighting fixture 206 may be equal to the low-end intensity $L_{LE\text{-}DRIVER}$ of the LED driver 210.

The control module 212 may be configured to control the intensity of the cumulative light emitted by the lighting fixture 206 below the low-end intensity $L_{LE\text{-}DRIVER}$ of the LED driver 210, for example, by diverting at least a portion of the output current $I_{OUT}$ of the LED driver 210 away from one or both of the LED light sources 202, 204. The control module 212 may split the remaining current of the output current $I_{OUT}$ between the first and second LED light sources 202, 204 to achieve the requested color temperature of the cumulative light emitted by the lighting fixture 206. In this example, the sum of the magnitudes of the diverted current and the first and second LED currents $I_{LED1}$, $I_{LED2}$ may be approximately equal to the magnitude of the output current $I_{OUT}$. The system controller may be configured to transmit a command including the requested intensity and the requested color temperature to the control module 212.

The control module 212 may be configured to fade the intensity of the cumulative light emitted by the lighting fixture 206 (e.g., gradually adjust the intensity over a period of time), for example, to provide a "soft-on" feature when fading the lighting fixture 206 on and a "fade-to-black" feature when fading the lighting fixture 206 off (e.g., as in the control module 106 described above). When fading the intensity of the lighting fixture 206, the control module 212 may be configured to control the intensity of the lighting fixture 206 below the low-end of the lighting fixture by diverting at least a portion of the output current $I_{OUT}$ of the LED driver 210 away from both of the LED light sources 202, 204.

The control module 212 may also be configured to modulate one or both of the first and second LED currents $I_{LED1}$, $I_{LED2}$ to cause the respective LED light sources 202, 204 to emit optical communication signals, e.g., VLC signals.

Figure 3:
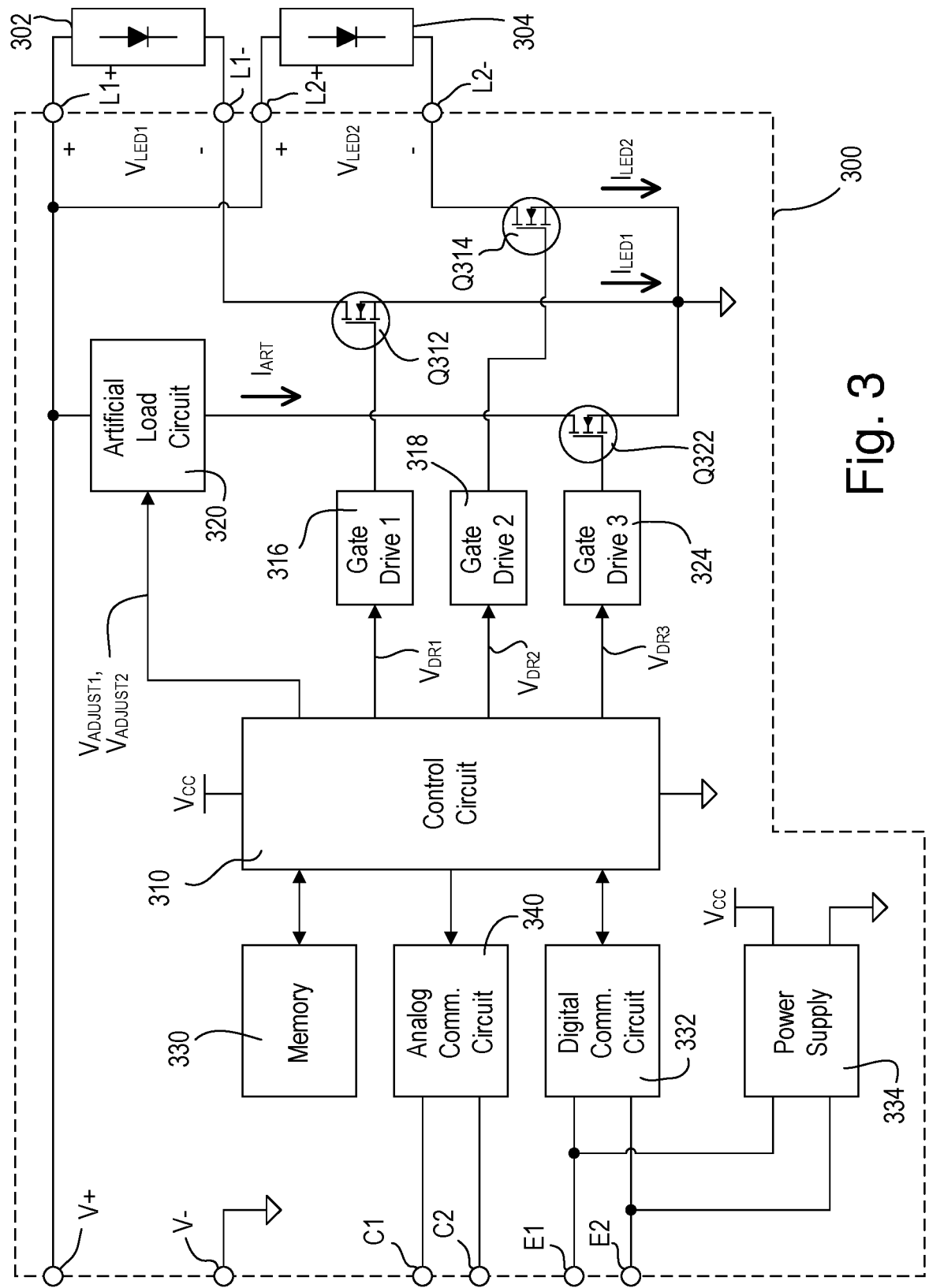
FIG. 3 is a simplified block diagram of an example control module for controlling one or more electrical loads, such as light-emitting diode (LED) light sources.

FIG. 3 is a simplified block diagram of an example control module 300, which may be deployed as the control module 112 of the load control system 100 shown in FIG. 1 and/or the control module 212 of the load control system 200 shown in FIG. 2. The control module 300 may comprise direct-current (DC) voltage input terminals V+, V− that are adapted to be coupled to a load regulation device, such as an LED driver (e.g., the LED driver 110 shown in FIG. 1 or the LED driver 210 shown in FIG. 2) for receiving an output voltage $V_{OUT}$ and conducting an output current $I_{OUT}$ of the LED driver. The control module 300 may comprise multiple sets of output terminals (e.g., two sets of output terminals as shown in FIG. 3). The output terminals may be adapted to be coupled to respective electrical loads, such as LED light sources, that may be installed in a lighting fixture (e.g., the lighting fixtures 106, 206), e.g., with the control module and the LED driver. For example, the control module 300 may comprise a first set of output terminals L1+, L1− adapted to be coupled to a first LED light source 302 and a second set of output terminals L2+, L2− adapted to be coupled to a second LED light source 304.

The control module 300 may comprise a control circuit 310 for controlling the intensities of the LED light sources 302, 304. The control circuit 310 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 310 may be coupled to a memory 330 for storing the operational characteristics of the control module 300.

The control module 300 may comprise a first and second controllably conductive devices, such as respective field-effect transistors (FETs) Q312, Q314 (e.g., MOSFETs). The FETs Q312, Q314 may have main terminals adapted to be electrically coupled in series with the first and second LED light sources 302, 304, respectively. The control circuit 310 may be configured to generate first and second drive signals $V_{DR1}$, $V_{DR2}$ that may be coupled to gates of the FETs Q312, Q314 via respective gate drive circuits 316, 318. The control circuit 310 may be configured control the FETs Q312, Q314 to steer portions of the output current $I_{OUT}$ of the LED driver through the respective LED light sources 302, 304.

For example, the control circuit 310 may be configured to control the first FET Q312 to conduct a first LED current $I_{LED1}$ through the first LED light source 302 and generate a first LED voltage $V_{LED1}$ across the first LED light source. The control circuit 310 may be configured to control the second FET Q314 to conduct a second LED current $I_{LED2}$ through the second LED light source 304 and generate a second LED voltage $V_{LED2}$ across the second LED light source. For example, the control circuit 310 may be configured to pulse-width modulate the FETs Q312, Q314 to conduct pulses of the output current $I_{OUT}$ of the LED driver through the respective LED light sources 302, 304 at different times. The control circuit 310 may also be configured to control each of the FETs Q312, Q314 in the linear region, such that the first and second LED currents $I_{LED1}$, $I_{LED2}$ have constant magnitudes (e.g., that are less than the magnitude of the output current $I_{OUT}$).

The control module 300 may further comprise an artificial load circuit 320 (e.g., an internal dummy load circuit) and a third FET Q322 having main terminals coupled in series with the artificial load circuit. The control circuit 310 may be configured to generate a third drive signal $V_{DR3}$ that may be coupled to a gate of the third FET Q322 via a third gate drive circuit 324. The control circuit 310 may be configured to control the FET Q322 to conduct an artificial load current $I_{ART}$ in order to divert current away from the first and second LED light sources 302, 304 to allow the control module 300 to control the intensity of the lighting fixture to be less than a low-end intensity $L_{LE\text{-}DRIVER}$ of the LED driver. The artificial load circuit 320 may be configured to operate in a similar manner as one of LED light sources 302, 304, for example, by having a similar current-voltage (I-V) curve so as to mimic the operation of an LED light source.

The control circuit 310 may be coupled to the artificial load circuit 320 for adjusting the operating characteristics (e.g., the I-V curve) of the artificial load circuit in response to one or more control signals $V_{ADJUST1}$, $V_{ADJUST2}$ generated by the control circuit. For example, the control circuit 310 may be configured to adjust a high-end voltage $V_{HE}$ at which the artificial load circuit 320 may operate when the magnitude of the artificial load current $I_{ART}$ is controlled to a high-end current $I_{HE}$ (e.g., when the lighting fixture is at the high-end intensity $L_{HE}$). In addition, the control circuit 310 may be configured to adjust a low-end voltage $V_{LE}$ at which the artificial load circuit 320 may operate when the magnitude of the artificial load current $I_{ART}$ is controlled to a low-end current $I_{LE}$ (e.g., when the lighting fixture is at the low-end intensity $L_{LE}$). The control circuit 310 may be configured to adjust the high-end voltage $V_{HE}$ and the low-end voltage $V_{LE}$ during configuration procedure during manufacturing of the control module 300 or a commissioning procedure after installation of the control module. The control circuit 310 may then maintain the values of the high-end voltage $V_{HE}$ and the low-end voltage $V_{LE}$ during normal operation. In addition, the values of the high-end voltage $V_{HE}$ and the low-end voltage $V_{LE}$ may be updated (e.g., updated over time) after installation. Examples procedures for calibrating and/or tuning the artificial load circuit 300 will be described with greater detail below.

The control circuit 310 may be configured to pulse-width modulate one or more (e.g., all) of the FETs Q312, Q314, Q322 to conduct pulses of the output current $I_{OUT}$ of the LED driver through the respective LED light sources 302, 304 and the artificial load circuit 320, e.g., at different times. The control module 310 may be configured to adjust a duty cycle $DC_{ART}$ of the third drive signal $V_{DR3}$ to adjust the magnitude of the artificial load current from zero amps (e.g., at a minimum duty cycle $DC_{MJN}$, e.g., 0%) to the magnitude of the output current $I_{OUT}$ of the LED driver (e.g., at a maximum duty cycle $DC_{MAX}$, e.g., 100%). The control circuit 310 may also be configured to control each of the FETs Q312, Q314, Q322 in the linear region, such that the first LED current $I_{LED1}$, the second LED current $I_{LED2}$, and the artificial load current $I_{ART}$ have constant magnitudes (e.g., that are less than the magnitude of the output current $I_{OUT}$).

The control module 300 may also comprise a digital communication circuit 332, which may be coupled to a digital communication link, for example, a wired communication link or a wireless communication link, such as a radio-frequency (RF) communication link or an infrared (IR) communication link. As shown in FIG. 3, the digital communication circuit 332 may be coupled to a wired digital communication link, such as, a digital addressable lighting interface (DALI) communication link or an Ecosystem® communication link, via two communication link terminals E1, E2. The control circuit 310 may be coupled to the digital communication circuit 332 for transmitting and/or receiving digital messages via the communication link (e.g., transmitting digital messages to and/or receiving digital messages from a system controller, LED drivers, and/or other control modules). The control circuit 310 may be configured to receive commands for controlling the intensity and/or the color temperature of the cumulative light emitted by the lighting fixture via the digital communication circuit 332. In addition, the control circuit 310 may also be configured to update the operational characteristics stored in the memory 330 in response to digital messages received via the digital communication circuit 332.

The control module 300 may further comprise a power supply 334, which may generate a DC supply voltage $V_{CC}$ for powering the control circuit 310, the memory 330, the digital communication circuit 332, and the other low-voltage circuitry of the control module. The power supply 334 may be powered from the communication link via the communication link terminals E1, E2, such that the power supply 334 does not need to consume any of the output current $I_{OUT}$ of the LED driver.

The control module 300 may additionally be configured to be connected to the LED driver via an analog communication link, such as a 0-10V control link, as shown in FIG. 2. Accordingly, the control module 300 may optionally comprise an analog communication circuit 340, such as a 0-10V control circuit. The analog communication circuit 340 may be coupled to the analog control link via control link terminals C1, C2. The analog communication circuit 340 may comprise a current sink circuit adapted to sink current from the LED driver via the analog control link. The LED driver 104 may be configured to generate a link supply voltage (e.g., approximately 10 V) to allow the current sink circuit of the analog communication circuit 340 to generate an analog control signal on the analog control link.

While the control modules 112, 212, 300 shown in FIGS. 1-3 are each described as controlling two LED light sources having different colors in order to control the intensity and/or color temperature, the lighting fixtures could include other types or numbers of LED light sources. For example, a lighting fixture could include two LED light sources of different power ratings, and a control module of the lighting fixture may adjust the intensity of a first LED light source to adjust the total intensity of the cumulative light emitted by the lighting fixture from approximately 100% to 10%, and adjust the intensity of a second LED light source to adjust the total intensity of the cumulative light emitted by the lighting fixture from approximately 10% to 1%. In addition, a lighting fixture could include more LED light sources having different colors, and a control module of the lighting fixture may control the LED light sources to provide a larger gamut of colors of the cumulative light emitted by the lighting fixture, for example, red-green-blue (RGB) control. Further, a lighting fixture could include a single LED light source, and a control module of the lighting fixture may control the LED light source to simply dim the LED light source to an intensity level less than a low-end intensity of an LED driver in the lighting fixture.

Figure 4A:
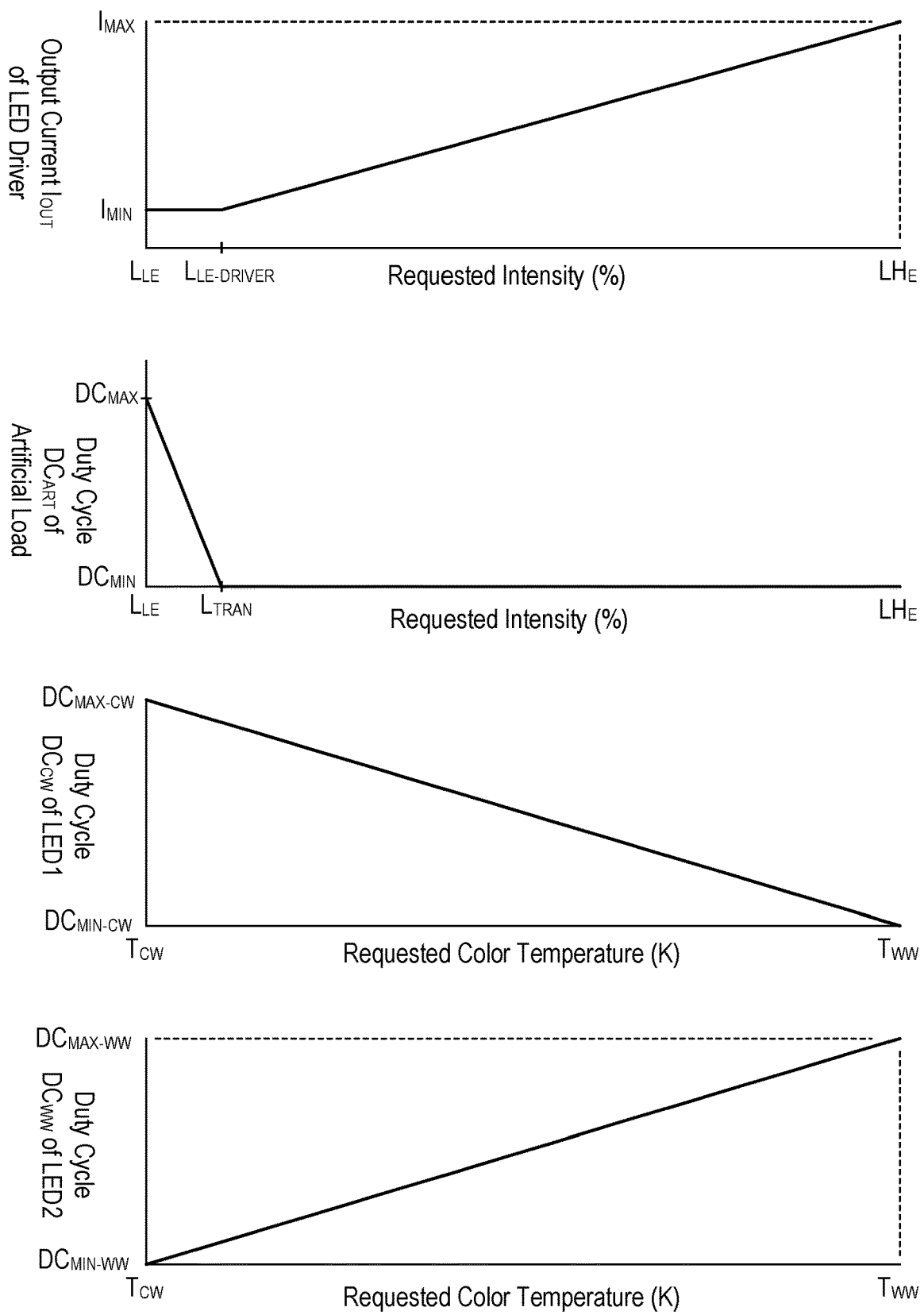
FIGS. 4A and 4B show example relationships between operating parameters of an LED driver and a control module for controlling one or more LED light sources in response to a requested intensity and/or a requested color (e.g., a requested color temperature).
Figure 4B:
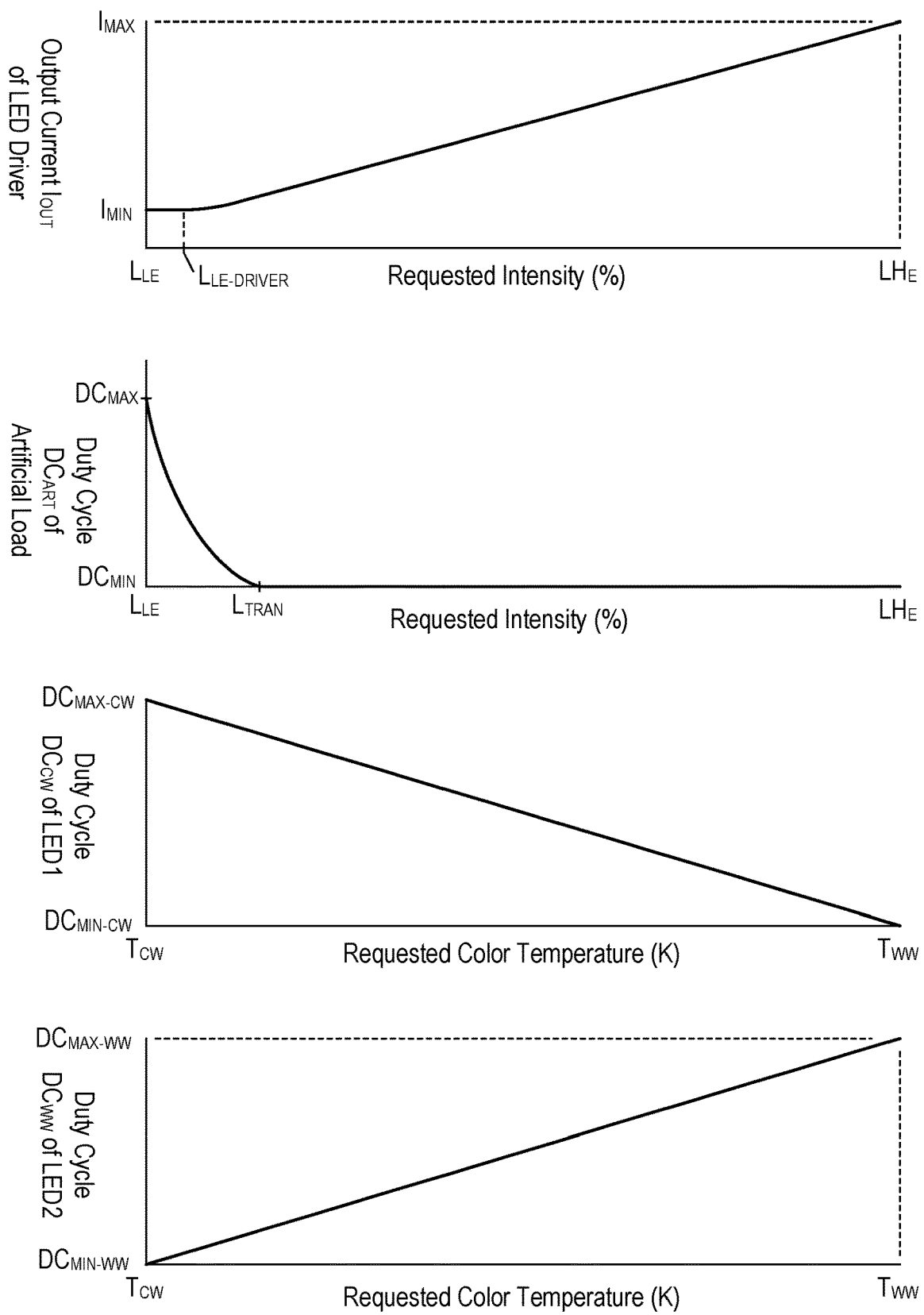

FIGS. 4A and 4B show example relationships between operating parameters of an LED driver (e.g., the LED drivers 110, 210) and a control module (e.g., the control modules 112, 212, 300) that may be installed together in a lighting fixture for controlling two LED light sources in response to a requested intensity and/or a requested color (e.g., a requested color temperature). The requested intensity and/or the requested color temperature may be transmitted to the LED driver and/or the control module via a digital communication link (e.g., the communication links 114, 214 shown in FIGS. 1 and 2). The requested intensity may vary between a high-end intensity $L_{HE}$ (e.g., 100%) and a low-end intensity $L_{LE}$ (e.g., approximately 0.1-10%). The requested color temperature may vary between a cool-white color temperature $T_{CW}$ and a warm-white color temperature $T_{WW}$.

The output current $I_{OUT}$ of the LED driver may be controlled in response to the requested intensity as shown in FIGS. 4A and 4B. For example, if the LED driver and the control module both receive a command including the requested intensity (e.g., as in the load control system 100 of FIG. 1), the LED driver may adjust the magnitude of the output current as a function of the requested intensity and the control module may control the magnitude of the artificial load current $I_{ART}$ as a function of the requested intensity. If only the control module receives a command including the requested intensity (e.g., as in the load control system 200 of FIG. 2), the control module may generate an analog control signal for controlling the LED driver to adjust the magnitude of the output current $I_{OUT}$ as a function of the requested intensity and may control the magnitude of the artificial load current $I_{ART}$ as a function of the requested intensity.

When the requested intensity is greater than a transition intensity $L_{TRAN}$, the control module may control the duty cycle $DC_{ART}$ of the third drive signal $V_{DR3}$ to 0% to render the artificial load circuit 320 non-conductive and disable the artificial load circuit 320. For example, the transition intensity may be equal to the low-end intensity $L_{LE-DRIVER}$ of the LED driver as shown in FIG. 4A. When the requested intensity is greater than the low-end intensity $L_{LE-DRIVER}$ of the LED driver, the LED driver may control the magnitude of the output current $I_{OUT}$ between the maximum current $I_{MAX}$ at the high-end intensity $L_{HE}$ (e.g., the high-end intensity $L_{HE-DRIVER}$ of the LED driver) and the minimum current $I_{MIN}$ at the low-end intensity $L_{LE-DRIVER}$ of the LED driver as shown in FIG. 4A.

When the requested intensity is less than or equal to the transition intensity $L_{TRAN}$ (e.g., the low-end intensity $L_{LE-DRIVER}$ of the LED driver as shown in FIG. 4A), the LED driver may maintain the magnitude of the output current $I_{OUT}$ at the minimum current $I_{MIN}$ and the control module may adjust the duty cycle $DC_{ART}$ of the third drive signal $V_{DR3}$ as a function of the requested intensity. For example, the control module may adjust the duty cycle $DC_{ART}$ of the third drive signal $V_{DR3}$ from the minimum duty cycle $DC_{MIN}$ (e.g., 0%) at the transition intensity $L_{TRAN}$ (e.g., the low-end intensity $L_{LE-DRIVER}$ of the LED driver) to the maximum duty cycle $DC_{MAX}$ (e.g., 100%) at the low-end intensity $L_{LE}$ of the requested intensity range. To illustrate, the low-end intensity $L_{LE-DRIVER}$ of the LED driver may be 10%. Upon receiving a control input (e.g., a command) indicating a requested intensity of 1% (e.g., one tenth of the low-end intensity $L_{LE-DRIVER}$ of the LED driver), the control module may set the cumulative duty cycles of the first and second drive signals $V_{DR1}$ and $V_{DR2}$ to 10%, and may set the duty cycle of the third drive signal $V_{DR3}$ to 90%. This way, 90% of the minimum current $I_{MIN}$ of the LED driver may be diverted through the artificial load, leaving only 10% of the minimum current $I_{MIN}$ of the LED driver to be conducted through the real light sources. As a result, the cumulative light output of the lighting fixture may be dimmed down to 1% (e.g., one tenth of the low-end intensity $L_{LE-DRIVER}$ of the LED driver).

The control module may control the magnitude of the first and second LED currents $I_{LED1}$, $I_{LED2}$ to control the color temperature of the cumulative light emitted by the lighting fixture in response to the requested color temperature. For example, the control module may control a duty cycle $DC_{CW}$ of the cool-white LED light source to a maximum duty cycle $DC_{Max\text{-}CW}$ (e.g., 100%) and a duty cycle $DC_{WW}$ of the warm-white LED light source to a minimum duty cycle $DC_{MIN\text{-}WW}$ (e.g., 0%) when the requested color temperature is the cool-white color temperature $T_{CW}$. The control module may control the duty cycle $DC_{CW}$ of the cool-white LED light source to a minimum duty cycle $DC_{MIN\text{-}WW}$ (e.g., 0%) and the duty cycle $DC_{WW}$ of the warm-white LED light source to a maximum duty cycle $DC_{MAX\text{-}WW}$ (e.g., 100%) when the requested color temperature is the warm-white color temperature $T_{WW}$. For example, as shown in FIG. 4A, the control module may be configured to control the duty cycle $DC_{CW}$ of the cool-white LED light source and the duty cycle $DC_{WW}$ of the warm-white LED light source linearly between these points in response to the requested color temperature. In addition, the control module may be configured to control the duty cycles $DC_{CW}$, $DC_{WW}$ of the cool-white LED light source and the warm-white LED light source non-linearly in response to the requested color temperature.

The transition intensity $L_{TRAN}$ may also be greater than the low-end intensity $L_{LE\text{-}DRIVER}$ of the LED driver (e.g., as shown in FIG. 4B) to avoid noticeable step changes and/or rate changes in the intensity of the lighting load (e.g., noticeable to the average human eye) when adjusting the intensity around the transition intensity $L_{TRAN}$. When the transition intensity $L_{TRAN}$ is greater than the low-end intensity $L_{LE\text{-}DRIVER}$ of the LED driver, the LED driver may be controlled to the low-end intensity $L_{LE\text{-}DRIVER}$ at a lower requested intensity (e.g., the low-end intensity $L_{LE\text{-}DRIVER}$ of the LED driver may be closer to the low-end intensity $L_{LE}$ of the requested intensity range than shown in FIG. 4A). The low-end intensity $L_{LE}$ of the requested intensity range may be equal to the low-end intensity $L_{LE\text{-}DRIVER}$ of the LED driver. When the transition intensity $L_{TRAN}$ is greater than the low-end intensity $L_{LE\text{-}DRIVER}$ of the LED driver, the duty cycles $DC_{CW}$, $DC_{WW}$ of the cool-white LED light source and the warm-white LED light source may be adjusted in response to the requested color temperature in the same manner as shown in FIG. 4B.

Below the transition intensity $L_{TRAN}$, the control module may adjust the duty cycle $DC_{ART}$ of the third drive signal $V_{DR3}$ from the minimum duty cycle $DC_{MIN}$ at the transition intensity $L_{TRAN}$ to the maximum duty cycle $DC_{MAX}$ at the low-end intensity $L_{LE}$ of the requested intensity range. For a portion of requested intensity range, the magnitude of the output current $I_{OUT}$ of the LED driver and the duty cycle $DC_{ART}$ of the third drive signal $V_{DR3}$ may be controlled together to achieve the requested intensity of the lighting fixture. The relationship between the duty cycle $DC_{ART}$ of the third drive signal $V_{DR3}$ and the requested intensity may be non-linear (e.g., as shown in FIG. 4B) or linear.

Figure 5A:
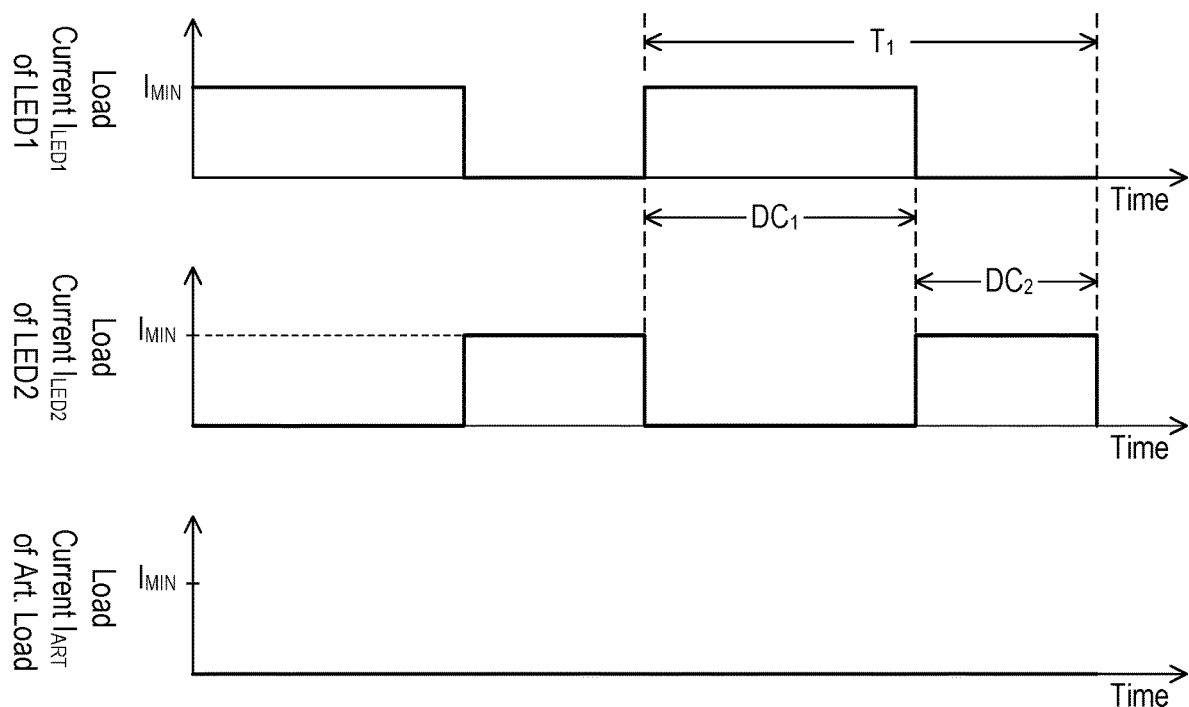
FIGS. 5A and 5B show example waveforms illustrating the operation of a control module for controlling one or more electrical loads, such as light-emitting diode (LED) light sources.
Figure 5B:
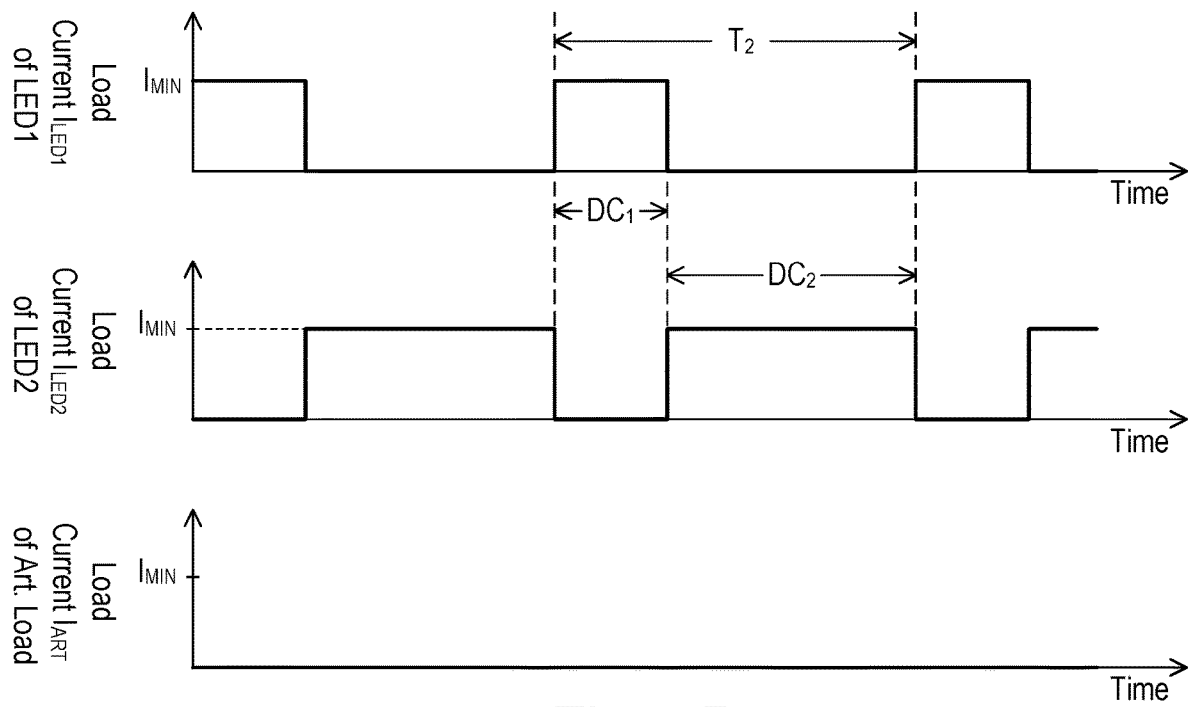

FIGS. 5A and 5B show example waveforms illustrating the operation of a control module (e.g., the control module 300) when the requested intensity is greater than or equal to the low-end intensity $L_{LE\text{-}DRIVER}$ of the LED driver. At this time, the control module may be configured to control the duty cycle $DC_{ART}$ of the third drive signal $V_{DR3}$ to zero (e.g., as shown in FIG. 4). The control module may be configured to control a duty cycle $DC_1$ of the first drive signal $V_{DR1}$ to be equal to the duty cycle $DC_{CW}$ of the cool-white LED light source, and a duty cycle $DC_2$ of the second drive signal $V_{DR2}$ to be equal to the duty cycle $DC_{WW}$ of the warm-white LED light source. As a result, the control module may be configured to control the duty cycles $DC_1$, $DC_2$ of the first and second drive signals $V_{DR1}$, $V_{DR2}$ in response to the requested color temperature (e.g., as shown in FIG. 4). The sum of the duty cycles $DC_1$, $DC_2$ may be approximately 100% since the duty cycle $DC_{ART}$ of the third drive signal $V_{DR3}$ is zero.

As the requested color temperature is adjusted, the control module may be configured to maintain an operating period $T_{OP}$ of the first and second drive signals $V_{DR1}$, $V_{DR2}$ constant, for example, at an operating period $T_1$ as shown in FIG. 5A. In addition, the operating period $T_{OP}$ may be varied as the requested color temperature changes and the duty cycles $DC_1$, $DC_2$ of the first and second drive signals $V_{DR1}$, $V_{DR2}$ are adjusted. For example, when the duty cycles $DC_1$, $DC_2$ of the first and second drive signals $V_{DR1}$, $V_{DR2}$ are adjusted to different values as shown in FIG. 5B, the operating period $T_{OP}$ may be adjusted to an operating period $T_2$. The operating period $T_{OP}$ may be adjusted such that the operating period for a first set of duty cycle values for the drive signals $V_{DR1}$, $V_{DR2}$ is different than the operating period for a second set of duty cycle values for the drive signals $V_{DR1}$, $V_{DR2}$ (e.g., the operating period for one set of duty cycle values for the drive signals $V_{DR1}$, $V_{DR2}$ may not be equal to the operating period for any of the other possible sets of duty cycle values).

Figure 6A:
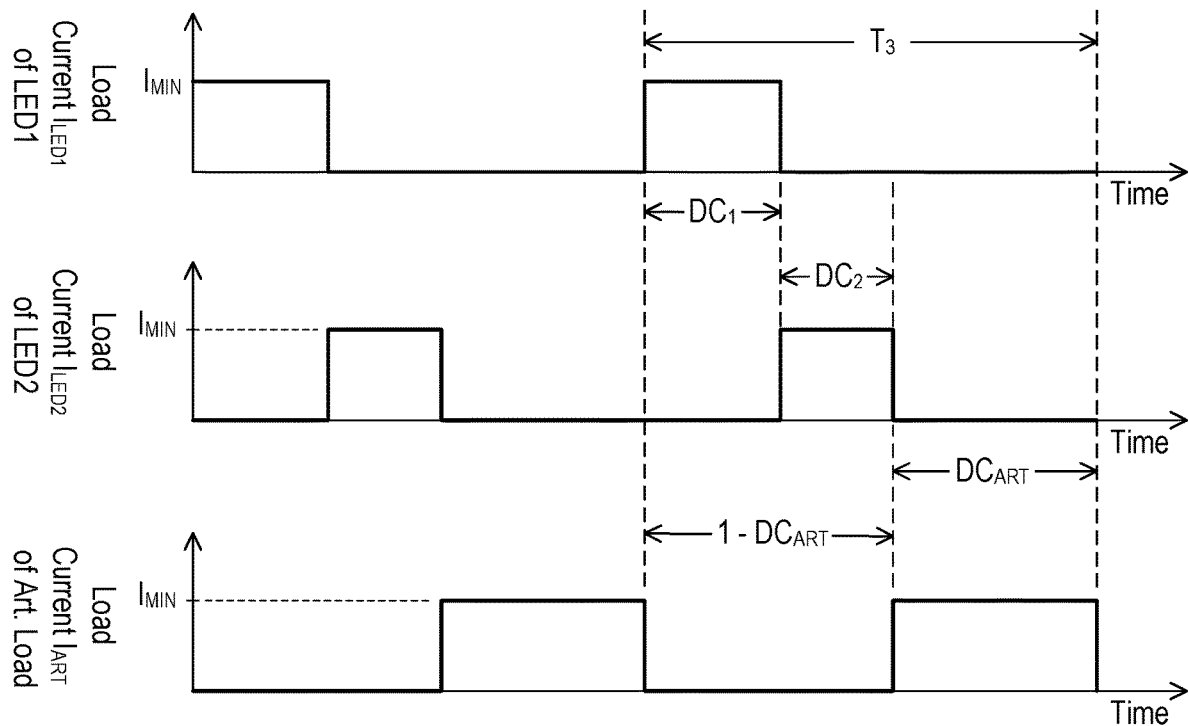
FIGS. 6A and 6B show example waveforms depicting adjustments of drive signal operating periods corresponding to changing duty cycles.
Figure 6B:
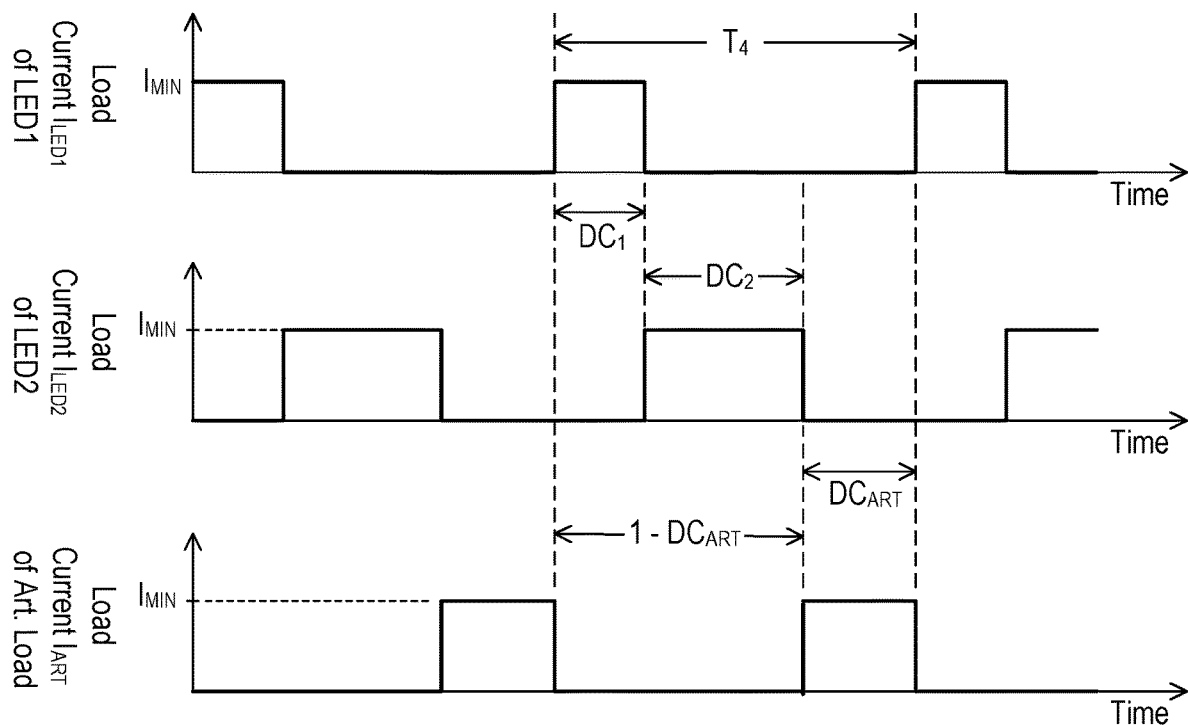

FIGS. 6A and 6B show example waveforms illustrating the operation of a control module (e.g., the control module 300) when the requested intensity is less than the low-end intensity $L_{LE\text{-}DRIVER}$ of the LED driver. The control module may be configured to control the duty cycle $DC_{ART}$ of the third drive signal $V_{DR3}$ in response to the requested intensity (e.g., as shown in FIG. 4). When the requested intensity is less than the low-end intensity $L_{LE\text{-}DRIVER}$ of the LED driver, the duty cycles $DC_1$, $DC_2$ of the first and second drive signals $VDR_1$, $V_{DR2}$ may not be equal to the duty cycle $DC_{CW}$ of the cool-white LED light source and the duty cycle $DC_{WW}$ of the warm-white LED light source, respectively. The control module may be configured to control the duty cycles $DC_1$, $DC_2$ of the first and second drive signals $V_{DR1}$, $V_{DR2}$ in response to the requested color temperature and the $DC_{ART}$ of the third drive signal $V_{DR3}$. For example, the duty cycle $DC_1$ of the first drive signal $V_{DR1}$ may be calculated using the following equation, e.g., $$DC_1 = DC_{CW}(1-DC_{ART}),$$

and the duty cycle $DC_2$ of the second drive signal $V_{DR2}$ may be calculated using the following equation, e.g., $$DC_2 = DC_{WW}(1-DC_{ART}),$$

where the duty cycles $D_{CW}$, $D_{WW}$ may be determined from the requested color temperature (e.g., as shown in FIG. 4).

The control module may be configured to maintain an operating period $T_{OP}$ of the first and second drive signals $V_{DR1}$, $V_{DR2}$ constant as the requested color temperature is adjusted, for example, at an operating period $T_3$ as shown in FIG. 6A. In addition, the operating period $T_{OP}$ may be varied as the requested color temperature changes and the duty cycles $DC_1$, $DC_2$, $DC_{ART}$ of the first, second, and third drive signals $V_{DR1}$, $V_{DR2}$, $V_{DR3}$ are adjusted. For example, when the duty cycles $DC_1$, $DC_2$, $DC_{ART}$ of the first, second, and third drive signals $V_{DR1}$, $V_{DR2}$, $V_{DR3}$ are adjusted to different values as shown in FIG. 6B, the operating period $T_{OP}$ may be adjusted to an operating period $T_4$. The operating period $T_{OP}$ may be adjusted such that the operating period for a first set of duty cycle values for the drive signals $V_{DR1}$, $V_{DR2}$, $V_{DR3}$ may be different than the second operating period for a second set of duty cycle values for the drive signals $V_{DR1}$, $V_{DR2}$, $V_{DR3}$ (e.g., the operating period for one set of duty cycle values for the drive signals $V_{DR1}$, $V_{DR2}$, $V_{DR3}$ may not be equal to the operating period for any of the other possible sets of duty cycle values).

Figure 7:
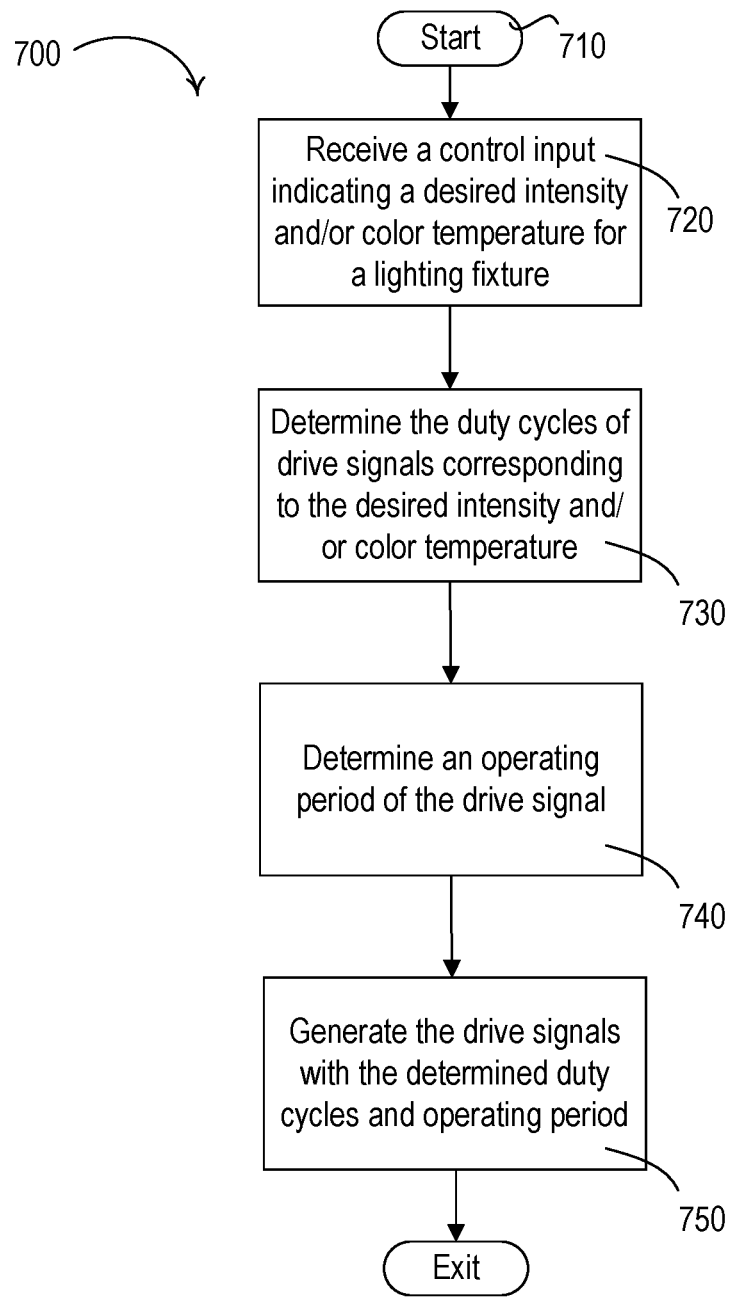
FIG. 7 shows an example procedure for varying the operating period of a drive signal corresponding to adjusting the duty cycle of the drive signal.

FIG. 7 is a flowchart of an example control procedure 700 for adjusting duty cycles and an operating period of one or more drive signals (e.g., the drive signals $V_{DR1}$, $V_{DR2}$, or $V_{DR3}$) for controlling an intensity and/or a color temperature of the cumulative light emitted by a lighting fixture. The control procedure 700 may be executed by a control module (e.g., the control module 300) to adjust the magnitude of load currents conducted through one or more light sources of the lighting fixture (e.g., the LED light sources 302, 304). The control procedure 700 may begin at 710. At 720, the control module may receive a control input (e.g., a command) indicating a requested intensity and/or color temperature of the lighting fixture. The control input may be received via a digital communication link (e.g., the communication links 114, 214 shown in FIGS. 1 and 2). At 730, the control module may determine the duty cycles of the drive signals for adjusting the intensity and/or color temperature of the lighting fixture to the requested intensity and/or color temperature. The determination of the duty cycles may be made, for example, based on the example relationships shown in FIG. 4, respectively.

At 740, the control module may determine the value of the operating period of the drive signals. The control module may be configured to determine the operating period at 740 in different ways. For example, the control module may determine the operating period based on a relationship (e.g., a predetermined relationship) between the operating period and the set of duty cycles determined at 730. The relationship may be, for example, a linear relationship in which the operating period may increase or decrease in proportion to an increase or decrease in the duty cycle. Other types of relationships including a non-linear relationship may also be employed to set the operating period. The control module may determine the operating period based on data stored in the control module (e.g., a look-up table including mapped values of operating periods and duty cycles). For example, the values of the look-up table may be chosen such that the operating period for a set of duty cycle values for the drive signals is not equal to the operating period for any of the other possible sets of duty cycle values. Alternatively or additionally, the control module may derive the operating period dynamically (e.g., without using preconfigured values) as the duty cycle of the drive signal is adjusted. In addition, the control module may determine the operating period randomly. The control module may impose limits on the range of values that may be assigned to the operating period. For example, the control module may be configured to keep the length of the operating period within a range so as the frequency of the drive signal does not cause undesirable flicking in the output of the lighting load.

Once the duty cycles and operating period have been determined, the control module may generate the drive signal with the determined duty cycle and operating period at 750, before the control procedure 700 exits.

Figure 8:
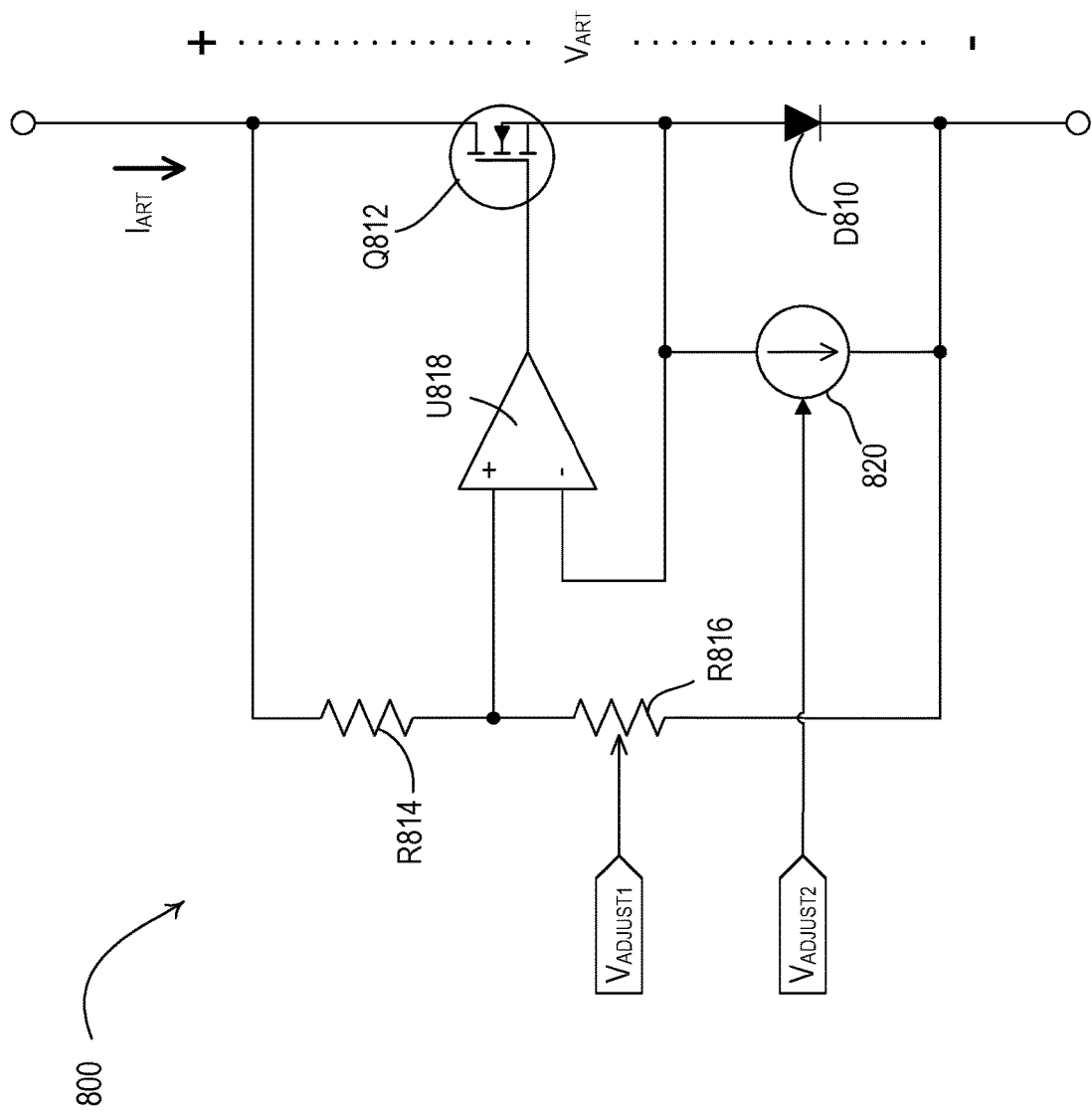
FIG. 8 is a simplified schematic diagram of an artificial load circuit of a control module for controlling one or more electrical loads, such as light-emitting diode (LED) light sources.

FIG. 8 is a simplified schematic diagram of an artificial load circuit 800 (e.g., the artificial load circuit 320 of the control module 300 shown in FIG. 3). The artificial load circuit 800 may be configured to conduct an artificial load current $I_{ART}$ and generate an artificial load voltage $V_{ART}$. The artificial load current $I_{ART}$ and the artificial load voltage $V_{ART}$ may be similar to an LED current and an LED voltage of an LED light source, respectively, such that the artificial load circuit 800 has a similar current-voltage (I-V) curve as the LED light source, for example, without producing illumination (e.g., to operate as a "dark" LED). The artificial load circuit 800 may comprise a diode D810 (e.g., a standard diode or a light-emitting diode), which may operate to establish the shape of the I-V curve of the artificial load circuit 800. While one diode D810 is shown in FIG. 8, a plurality of diodes in the same orientation may be coupled in parallel in place of the single diode D810. The diode D810 may be electrically coupled in series with main terminals of a field-effect transistor (FET) Q812 (e.g., a MOSFET). The artificial load circuit 800 may further comprise a first impedance element, such as a resistor R814, and a second impedance element, such as a potentiometer R816 (e.g., a controllable resistance and/or a digital potentiometer). The resistor R814 and the potentiometer R816 may be electrically coupled in series with each other. The series combination of the resistor R814 and the potentiometer R816 may be coupled in parallel with the series combination of the diode D810 and the FET Q812.

The artificial load circuit 800 may further comprise an operational amplifier U818. The operational amplifier U818 may include an output electrically coupled to drive a gate of the FET Q812. The operational amplifier U814 may have an inverting input coupled to the junction of the diode D810 and the FET Q812, and a non-inverting input coupled to the junction of the resistor R814 and the potentiometer R816. The operational amplifier U818 may operate to drive the FET Q812 in the linear region and to cause the voltage across the potentiometer R816 to be approximately equal to the voltage across the diode D810. The artificial load circuit 800 may receive a first adjustment control signal $V_{ADJUST1}$ (e.g., from the control circuit 310), which may be electrically coupled to a wiper input of the potentiometer R816 for tuning a resistance of the potentiometer to adjust a high-end voltage $V_{HE}$ (e.g., a maximum value of the artificial load voltage $V_{ART}$) at which the artificial load circuit 800 may operate when the artificial load circuit is conducting a high-end current $I_{HE}$ (e.g., a maximum value of the artificial load current $I_{ART}$).

The artificial load circuit 800 may also comprise a controllable current sink circuit 820, which may be electrically coupled in parallel with the diode D810 for increasing the magnitude of the artificial load current $I_{ART}$. The artificial load circuit 800 may receive a second adjustment control signal $V_{ADJUST2}$ (e.g., from the control circuit 310), which may be electrically coupled to the controllable current sink circuit 810 for adjusting the magnitude of a sink current drawn by the controllable current sink to adjust a low-end current $I_{LE}$ (e.g., a minimum value of the artificial load current $I_{ART}$) and a low-end voltage $V_{LE}$ (e.g., a minimum value of the artificial load voltage $V_{ART}$) at which the artificial load circuit 800 may operate when the lighting fixture is at the low-end intensity $L_{HE}$.

Figure 9:
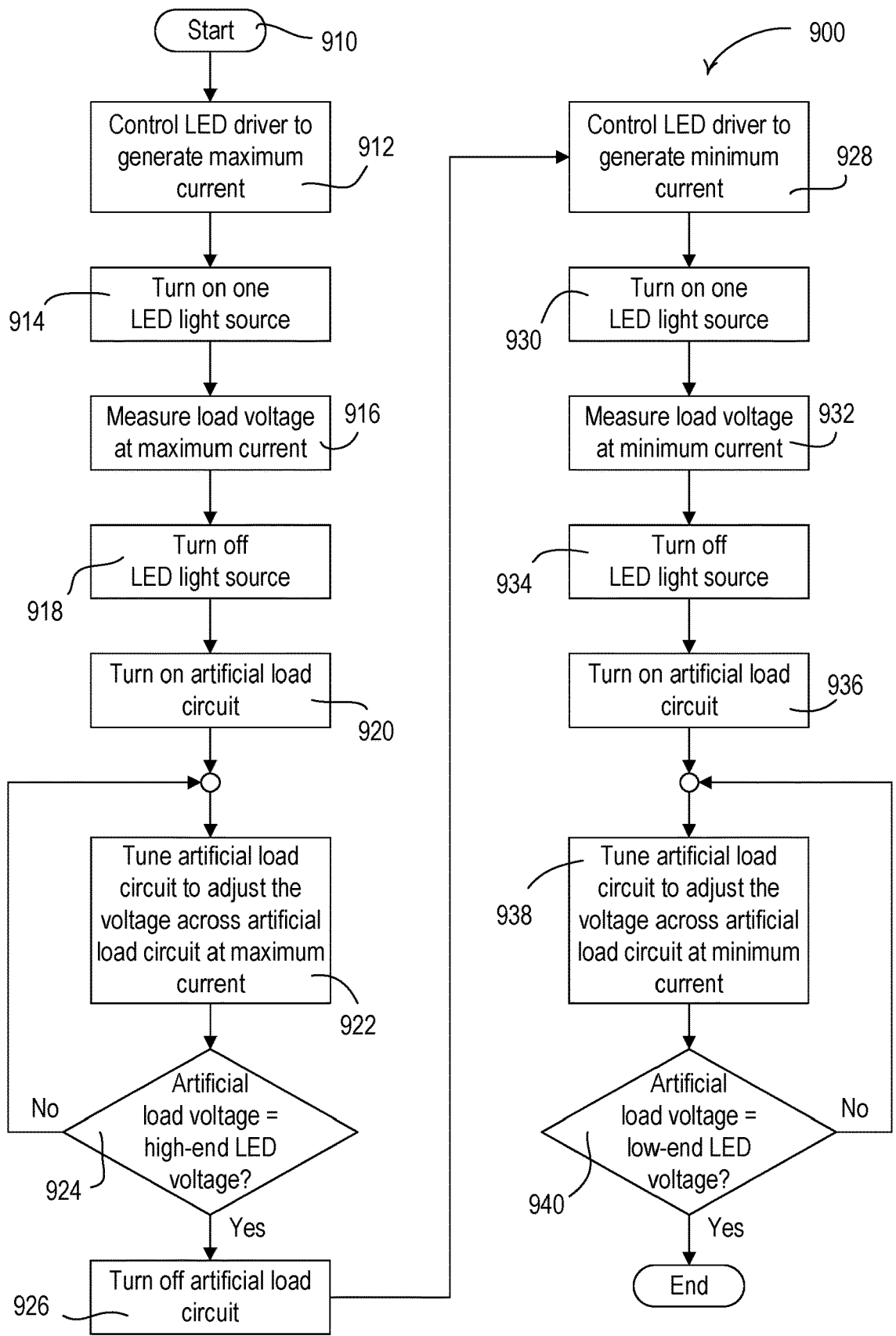
FIG. 9 shows a first example procedure for tuning and/or calibrating an artificial load to mimic the characteristics of an actual load.

FIG. 9 is a flowchart of an example calibration procedure 900 for tuning and/or calibrating an artificial load circuit (e.g., the artificial load circuit 320, 800) so that the artificial load circuit may mimic the characteristics (e.g., an I-V curve) of an actual load that may be coupled in parallel with the artificial load circuit (e.g., one or more of the LED light sources 202, 204, 302, 304). The configuration procedure 900 may be executed by a control circuit of a control module in which the artificial load may be included (e.g., by the control circuit 310 of the control module 300). The control module in this example may be capable of controlling an LED driver via an analog control link, such as the analog control link 216 as shown in FIG. 2. The configuration procedure 900 may be executed at 910, for example, during manufacturing of the control module, during a commissioning procedure after installation of the control module, upon entering a special mode (e.g., a calibration mode), upon powering up to start normal operation, and/or the like.

At 912, the control circuit may control the LED driver coupled to the control module to output a maximum current $I_{MAX}$ (e.g., a high-end current). The control circuit may transmit a control signal (e.g., a control signal with a magnitude of approximately 10V) via the analog control link to the LED driver to cause the LED driver to adjust its output current $I_{OUT}$ to a maximum magnitude. At 914, the control circuit may turn on one (e.g., only one) of the LED light sources connected to the control module. For example, the control circuit may render conductive a controllably conductive device in series with the LED light source (e.g., one of the FETs Q312, Q314) at 914. At 916, the control circuit may measure a magnitude (e.g., a high-end magnitude) of an LED voltage generated across the LED light source (e.g., the first and/or second LED voltages $V_{LED1}$, $V_{LED2}$) while the LED light source is conducting the maximum current $I_{MAX}$ of the LED driver. For example, the control module may comprise a voltage divider circuit coupled across the input terminals V+, V− for generating a scaled voltage that may be received by an analog-to-digital converter (ADC) of the control circuit for measuring the magnitude of the LED voltage. At 918, the control circuit may turn off the LED light source (e.g., by rendering the controllably conductive device that is in series with the LED light source non-conductive).

At 920, the control circuit may turn on the artificial load circuit, for example, by rendering conductive a controllably conductive device in series with the artificial load circuit (e.g., the FET Q322). At 922, the control circuit may tune the artificial load circuit to adjust the magnitude of an artificial load voltage generated across the artificial load circuit (e.g., the artificial load voltage $V_{ART}$) when the artificial load circuit is conducting the maximum current $I_{MAX}$ of the LED driver. For example, the control circuit may adjust the magnitude of the artificial load voltage by controlling the first adjustment control signal $V_{ADJUST1}$ to adjust a resistance of the potentiometer R816. At 924, the control circuit may measure the magnitude of the artificial load voltage. The control circuit may continue to adjust, at 922, the magnitude of the artificial load voltage until, at 924, the magnitude of the artificial load voltage is substantially equal to the high-end magnitude of the LED voltage generated across the LED light source when the LED light source was conducting the maximum current $I_{MAX}$ of the LED driver (e.g., as measured at 916). When the magnitude of the artificial load voltage is substantially equal to the measured high-end magnitude of the LED voltage at 924, the control circuit may stop tuning the artificial load circuit, such that a high-end voltage of the artificial load circuit may be substantially the same as that of the actual LED light source that the artificial load circuit is being tuned to mimic (e.g., so that the artificial load may mimic the characteristics of the actual load).

When the magnitude of the artificial load voltage is substantially equal to the measured high-end magnitude of the LED voltage at 924, the control circuit may turn off the artificial load circuit at 926, for example, by rendering the controllably conductive device in series with the artificial load circuit non-conductive. At 928, the control circuit may control the LED driver coupled to the control module to output a minimum current $I_{MIN}$ (e.g., a low-end current). At 930, the control circuit may turn on one (e.g., only one) of the LED light sources connected to the control module (e.g., the same LED light source that was turned on at 914), for example, by rendering the controllably conductive device in series with the LED light source conductive. At 932, the control circuit may measure a magnitude (e.g., a low-end magnitude) of the LED voltage generated across the LED light source while the LED light source is conducting the minimum current $I_{MIN}$ of the LED driver. At 934, the control circuit may turn off the LED light source, for example, by rendering the controllably conductive device in series with the LED light source non-conductive.

At 936, the control circuit may turn on the artificial load circuit, for example, by rendering the controllably conductive device in series with the artificial load circuit conductive. At 938, the control circuit may tune the artificial load circuit to adjust the magnitude of an artificial load voltage generated across the artificial load circuit when the artificial load circuit is conducting the minimum current $I_{MIN}$ of the LED driver. For example, the control circuit may adjust the magnitude of the artificial load voltage by controlling the second adjustment control signal $V_{ADJUST2}$ to adjust the magnitude of the sink current drawn by the controllable current sink 810. At 940, the control circuit may measure the magnitude of the artificial load voltage. The control circuit may continue adjust, at 938, the magnitude of the artificial load voltage until, at 940, the magnitude of the artificial load voltage is substantially equal to the low-end magnitude of the LED voltage generated across the LED light source when the LED light source was conducting the minimum current $I_{MIN}$ of the LED driver (e.g., as measured at 932). When the magnitude of the artificial load voltage is substantially equal to the measured low-end magnitude of the LED voltage at 940, the control circuit may stop tuning the artificial load circuit, such that a low-end voltage of the artificial load circuit may be substantially the same as that of the actual LED light source that the artificial load is being tuned to mimic (e.g., so that the artificial load may mimic the characteristics of the actual load). When the magnitude of the artificial load voltage is substantially equal to the measured low-end magnitude of the LED voltage at 940, the configuration procedure 900 may exit.

In the configuration procedure 900 shown in FIG. 9, the control circuit only turns on one LED light source at 914, 930, and measures the load voltage of that LED light source when conducting the maximum current $I_{MAX}$ and the minimum current $I_{MIN}$ at 916, 932. The control circuit may assume that the load voltages generated across both LED light sources may be approximately the same when conducting either the maximum current $I_{MAX}$ and the minimum current $I_{MIN}$. Alternatively or additionally, the control circuit may turn on multiple LED light sources one at a time and measure the load voltage of the LED light sources when conducting the maximum current $I_{MAX}$ and the minimum current $I_{MIN}$. For example, the control circuit may process (e.g., calculate an average of) the measured voltage voltages of the LED light sources when conducting either the maximum current $I_{MAX}$ and the minimum current $I_{MIN}$, and use the average value for tuning the artificial load circuit.

In addition, the control circuit may not measure the load voltage across one or more of the LED light sources when conducting the maximum current $I_{MAX}$ and the minimum current $I_{MIN}$. For example, the control circuit may retrieve from memory stored high-end and low-end magnitudes for the artificial load circuit, and use those values to tune the artificial load circuit. Alternatively, the control circuit may receive a message including high-end and low-end magnitudes for the artificial load circuit, and use those values to tune the artificial load circuit.

Figure 10:
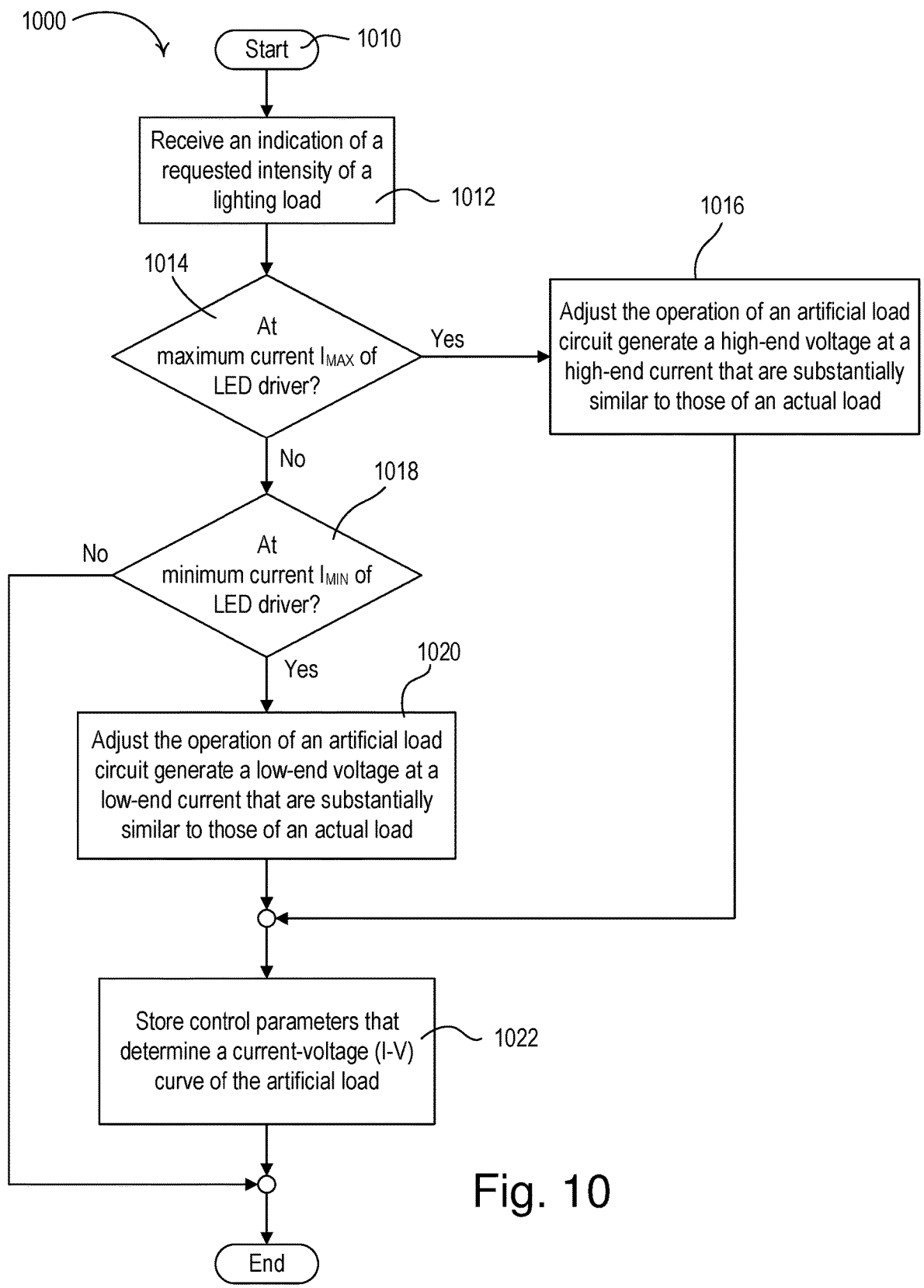
FIG. 10 shows a second example procedure for tuning and/or calibrating an artificial load to mimic the characteristics of an actual load.

FIG. 10 is a flowchart of an example configuration procedure 1000 for tuning and/or calibrating an artificial load circuit (e.g., the artificial load circuit 800) so that the artificial load circuit may mimic the characteristics of an actual load that may be coupled in parallel with the artificial load circuit (e.g., one or more of the light sources 102, 104, 302, 304). The configuration procedure 1000 may be executed by a control circuit of a control module in which the artificial load may be included (e.g., by the control circuit 310 of the control module 300). For example, the configuration procedure 1000 may be executed to match the current-voltage (I-V) curve of the artificial load to the I-V curve of at least one light source that the control module is controlling. The control module may be configured to transmit and/or receive messages via a communication link (e.g., the communication link 114 shown in FIG. 1). The control module may be coupled to an LED driver (e.g., the LED driver 110) that may also be configured to transmit and/or receive messages via the communication link, e.g., as depicted in FIG. 1. The configuration procedure 1000 may be executed at 1010, for example, during manufacturing of the control module, during a commissioning procedure after installation of the control module, upon entering a special mode (e.g., a calibration mode), during normal operation of the control module, and/or the like.

At 1012, the control circuit may receive a control input indicating a requested intensity. The control input may be received through a digital message transmitted on a communication link (e.g., the communication link 114). The communication link may be, for example, connected to both the control module and an LED driver coupled to the control module. At 1014, the control circuit may determine whether the requested intensity results in an output current $I_{OUT}$ of the LED driver being controlled to a maximum current $I_{MAX}$. If the control circuit determines that the output current of the LED driver is at the maximum current $I_{MAX}$, the control circuit may proceed to 1016. At 1016, the control circuit may conduct the maximum current $I_{MAX}$ from the LED driver and may tune the artificial load circuit so that a high-end voltage may be generated across the artificial load circuit while the artificial load circuit is conducting the maximum current $I_{MAX}$ (e.g., a high-end current $I_{HE}$). Such high-end current $I_{HE}$ and high-end voltage $V_{HE}$ may be substantially the same as those of an actual load that the artificial load is being tuned to mimic (e.g., so that the artificial load may mimic the characteristics of the actual load).

The tuning of the artificial load circuit at the high-end may be performed in various ways depending on the design of the artificial load. For example, the control circuit may tune the artificial load circuit as in 914-924 of the configuration procedure 900. In an example, the control circuit may generate a first control signal $V_{ADJUST1}$ that is electrically coupled to a wiper input of a potentiometer (e.g., the potentiometer R816 shown in FIG. 8). The potentiometer may be a controllable resistance and/or a digital potentiometer. The control signal $V_{ADJUST1}$ may cause the resistance of the artificial load to be adjusted so that the artificial load may conduct the high-end current $I_{HE}$ and generate the high-end voltage $V_{HE}$ in response to receiving the control input that indicates a high-end intensity.

If the control circuit determines that the requested intensity does not result in the output current $I_{OUT}$ of the LED driver being controlled to a maximum current $I_{MAX}$ at 1014, then the control circuit may further determine, at 1018, whether the requested intensity results in the output current $I_{OUT}$ of the LED driver being controlled to a minimum current $I_{MIN}$. If the control circuit determines that the output current $I_{OUT}$ of the LED driver is at the minimum current $I_{MIN}$ at 1018, the control circuit may move to 1020. At 1020, the control circuit may conduct the minimum current $I_{MIN}$ from the LED driver and may tune the artificial load circuit so that a low-end voltage $V_{LE}$ may be generated across the artificial load circuit while the artificial load circuit is conducting the minimum current $I_{MIN}$ (e.g., a low-end current $I_{LE}$). Such low-end current $I_{LE}$ and low-end voltage $V_{LE}$ may be substantially the same as those of the actual load that the artificial load is being tuned to mimic (e.g., so that the artificial load may mimic the characteristics of the actual load).

The tuning of the artificial load at the low-end may be performed in various ways depending on the design of the artificial load. For example, the control circuit may tune the artificial load circuit as in 930-940 of the configuration procedure 900. In an example, the control module may comprise a controllable current sink circuit (e.g., the controllable current sink 820), which may be electrically coupled in parallel with a diode (e.g., the diode D810) for increasing the magnitude of the current drawn by the controllable current sink to adjust the magnitude of the current conducted through the artificial load. With the output current $I_{OUT}$ of the LED driver being set at the low-end magnitude, the control circuit may generate a second control signal $V_{ADJUST2}$ that is coupled to the controllable current sink circuit to adjust the magnitude of the current drawn by the controllable current sink so that the artificial load may operate at the low-end current $I_{LE}$ and the low-end voltage $V_{LE}$ in response to receiving the control input indicating a low-end intensity.

Once the high-end and low-end currents and voltages of the artificial load circuit have been tuned, the control circuit may, at 1022, store the control parameters (e.g., the magnitudes of the first and second control signals $V_{ADJUST1}$, $V_{ADJUST2}$) that determine the current-voltage (I-V) curve for the artificial load circuit with which the artificial load may operate during normal operation of the control module. The configuration procedure 100 may then exit.

Although the example procedures shown in FIGS. 9 and 10 describe the determination an I-V curve for the artificial load between a high-end operating point and a low-end operating point of the artificial load, a skilled person in the art will appreciate that similar procedures may be used to determine an I-V curve that covers only a subset of operating points between the high-end and the low-end (e.g., to only cover an intensity range near the low-end such as between 0.1% and 10%). Further, although the I-V curve has been described in the examples as being determined primarily based on high-end and low-end operational characteristics of the artificial load, a skilled person in the art will appreciate that the I-V curve may be determined based on more than two operating points, including those between the high-end and the low-end operating points.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A control module for use in a load control system for controlling a cumulative light emitted by a lighting fixture, the lighting fixture comprising one or more light-emitting diode (LED) light sources and an LED driver adapted to receive power from a power source, the LED driver including an output for conducting an output current, the LED driver characterized by a low-end intensity, the control module comprising:
- a first controllably conductive device configured to be electrically coupled in series with a first LED light source;
- a control circuit configured to generate a first drive signal for rendering the first controllably conductive device conductive and non-conductive to control the magnitude of a first LED current through the first LED light source;
- an artificial load circuit; and
- a second controllably conductive device electrically coupled in series with the artificial load circuit;
- wherein the control circuit is configured to generate a second drive signal for rendering the second controllably conductive device conductive to divert at least a portion of the output current of the LED driver away from the first LED light source;
- wherein the control circuit is configured to pulse-width modulate the first and second drive signals and to determine respective duty cycles of the first and second drive signals in dependence upon a requested intensity for the cumulative light emitted by the lighting fixture, wherein the requested intensity is below the low-end intensity of the LED driver; and
- a third controllably conductive device configured to be electrically coupled in series with a second LED light source,
- wherein the control circuit is configured to control the third controllably conductive device to control the magnitude of a second LED current through the second LED light source;
- wherein the first and second LED light sources are different colors, and the control circuit is configured to control the magnitudes of the first and second LED currents to adjust a color temperature of the cumulative light emitted by the lighting fixture.

2. The control module of claim 1, wherein the control circuit is configured to generate third drive signals for rendering the second controllably conductive device conductive and non-conductive, the control circuit configured to pulse-width modulate the third drive signals, the control circuit configured to determine respective duty cycles of the first and third drive signals in dependence upon a requested color temperature for the cumulative light emitted by the lighting fixture.

3. The control module of claim 2, wherein the control circuit is configured to adjust the duty cycle of the second drive signal as a function of the requested intensity when the requested intensity is less than the low-end intensity of the LED driver.

4. The control module of claim 2, wherein, when the requested intensity is less than the low-end intensity of the LED driver, the control circuit is configured to adjust the respective duty cycles of the first and third drive signals in dependence upon the requested color temperature and the duty cycle of the second drive signal.

5. The control module of claim 2, wherein, when the requested intensity is greater than the low-end intensity of the LED driver, the control circuit is configured to control the duty cycle of the second drive signal to zero, and adjust the respective duty cycles of the first and third drive signals in dependence upon the requested color temperature.

6. The control module of claim 2, wherein the control circuit is configured to adjust an operating period of the first, second, and third drive signals as the requested color temperature changes.

7. The control module of claim 6, wherein the control circuit is configured to adjust the operating period of the first, second, and third drive signals as a function of at least one of the requested color temperature or the duty cycle of one or more of the first, second, or third drive signals.

8. The control module of claim 6, wherein the control circuit is configured to determine the operating period of the first, second, and third drive signals from a look-up table in dependence upon at least one of the requested color temperature or the duty cycle of one or more of the first, second, or third drive signals.

9. The control module of claim 6, wherein the control circuit is configured to adjust the operating period of the first, second, and third drive signals randomly as the requested color temperature changes.

10. The control module of claim 2, wherein the control circuit is configured to maintain an operating period of the first, second, and third drive signals constant as the requested color temperature changes.

11. The control module of claim 2, further comprising:
- a first communication circuit configured to receive a control instruction via a first communication link;
- wherein the control circuit is configured to control the first controllably conductive device to control the magnitude of the first LED current through the first LED light source in response to control instruction.

12. The control module of claim 11, further comprising:
- a second communication circuit configured to be coupled to the LED driver via a second communication link;
- wherein the control circuit is configured to control the LED driver via the second communication circuit to adjust the magnitude of the output current of the LED driver in response to the control instruction received via the first communication circuit.

13. The control module of claim 12, wherein the control instruction includes a requested intensity for the lighting fixture, the control circuit configured to adjust the magnitude of the output current of the LED driver as a function of the requested intensity.

14. The control module of claim 12, wherein the first communication circuit comprises a digital communication circuit configured to transmit and receive digital messages via a digital communication link, and the second communication circuit comprises an analog communication circuit configured to generate control signals on an analog control link.

15. The control module of claim 1, wherein the artificial load circuit has a current-voltage curve that approximates a current-voltage curve of the first LED light source.

16. The control module of claim 15, wherein the control circuit is configured to tune the current-voltage curve of the artificial load circuit.

* * * * *